(12) United States Patent
Lee et al.

(10) Patent No.: US 7,536,129 B2
(45) Date of Patent: May 19, 2009

(54) POWER TRANSMITTING APPARATUS, POWER SWITCHING APPARATUS, AND DRIVING APPARATUS OF MULTI-FUNCTION MACHINE USING THE SAME

(75) Inventors: Yong-hyun Lee, Suwon (KR); Dong-gyoo Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/878,149

(22) Filed: Jul. 20, 2007

(65) Prior Publication Data

US 2007/0261517 A1    Nov. 15, 2007

Related U.S. Application Data

(63) Continuation of application No. 10/715,402, filed on Nov. 19, 2003.

(30) Foreign Application Priority Data

Dec. 30, 2002   (KR)   ............................ 2002-86837
Dec. 30, 2002   (KR)   ............................ 2002-86838
Dec. 30, 2002   (KR)   ............................ 2002-86841

(51) Int. Cl.
*B41J 29/38*   (2006.01)

(52) U.S. Cl. .................. 399/88; 74/665 P; 74/665 G; 74/665 GA; 74/342; 74/343; 399/51; 399/177; 400/185; 400/186; 400/568; 400/569; 400/570; 347/10; 347/57; 347/128; 347/132; 347/247; 358/419; 358/420; 358/421; 358/422; 358/423; 358/502; 358/505

(58) Field of Classification Search .............. 271/10.01; 74/665 P, 665 G, 665 GA, 342, 343; 399/51, 399/88, 177; 400/185, 186, 568, 569, 570; 347/10, 57, 128, 132, 247; 358/419, 420, 358/421, 422, 423, 502, 505
See application file for complete search history.

(56) References Cited

U.S. PATENT DOCUMENTS 3,188,679 A  *  6/1965  Wubbe ................... 15/250.352

(Continued)

FOREIGN PATENT DOCUMENTS

JP                62016939 A        1/1987

(Continued)

OTHER PUBLICATIONS

U.S. Appl. No. 10/715,402, filed Nov. 19, 2003, Yong-Hyun Lee et al., Samsung Electronics Co., Ltd., Suwon-Si, Republic of Korea.

*Primary Examiner*—Gene Crawford
*Assistant Examiner*—Leslie A Nicholson, III
(74) *Attorney, Agent, or Firm*—Staas & Halsey LLP

(57) ABSTRACT

A driving apparatus of a multi-function machine includes a scanner unit scanning data recorded on a sheet of document and a document transport part to transport the sheet of document. A printer unit prints data on a sheet of paper for an output and includes a carrier including a print head with an ink jet nozzle mounted thereon to carry out the printing operation by moving the print head. The driving apparatus includes a driving motor, a scanner driving part driving the scanner unit, a printer driving part driving the printer unit, and a power switching part disposed with the driving motor, the scanner driving part, and the printer driving part. The power switching part selectively transmits a power of the driving motor to at least one of the scanner driving part and the printer driving part.

16 Claims, 20 Drawing Sheets

U.S. PATENT DOCUMENTS

| | | |
|---|---|---|
| 4,291,339 A | 9/1981 | Ogawa et al. |
| 4,349,287 A | 9/1982 | Chida et al. |
| 4,643,069 A | 2/1987 | Borisoff et al. |
| 4,649,437 A | 3/1987 | Watanabe |
| 4,700,437 A | 10/1987 | Hoshino |
| 4,770,555 A | 9/1988 | Deschamps et al. |
| 4,936,695 A | 6/1990 | Ishii |
| 4,967,239 A | 10/1990 | Sakakura |
| 5,051,969 A * | 9/1991 | Huang ........................ 368/223 |
| 5,206,737 A | 4/1993 | Sugiyama |
| 5,365,256 A | 11/1994 | Takahashi |
| 5,419,543 A | 5/1995 | Nakamura et al. |
| 5,904,591 A | 5/1999 | Shiau |
| 2004/0099090 A1 | 5/2004 | Hsu et al. |

FOREIGN PATENT DOCUMENTS

| | | |
|---|---|---|
| JP | 01304974 A | 12/1989 |

\* cited by examiner

POWER TRANSMITTING APPARATUS, POWER SWITCHING APPARATUS, AND DRIVING APPARATUS OF MULTI-FUNCTION MACHINE USING THE SAME

CROSS-REFERENCE TO RELATED APPLICATIONS

This application is a continuation of application Ser. No. 10/715,402 filed Nov. 19, 2003 and claims the benefit of Korean Application Nos. 2002-86837, 2002-86838, and 2002-86841, filed Dec. 30, 2002, in the Korean Intellectual Property Office, the disclosures of which are incorporated herein by reference.

BACKGROUND OF THE INVENTION

1. Field of the Invention

The present invention relates to a driving apparatus of a multi-function machine having a printer function and a scanner function, and more particularly to a power transmitting apparatus, which is able to prevent two coupled power transmitting gears from being disengaged from each other or worn away by each other when two frames, having the two coupled power transmitting gears mounted thereon, are wrongly assembled, where the power switching apparatus is able to drive a plurality of driving systems by one driving source, and a driving apparatus of a multi-function machine using the same.

2. Description of the Related Art

FIG. 1 shows a general multi-function machine 1. The multi-function machine 1 has a scanner unit 10 to scan data recorded on a sheet of document, and a printer unit 40 to print the data on the sheet of paper for an output, as basic components. According to a design, the multi-function machine 1 further includes a facsimile unit to copy the data and to transmit or receive the data through communication lines.

As shown in FIG. 2 and FIG. 3, the scanner unit 10 includes a document transport part 8 to transport the sheet of document D, a scanner 18 to read data out of the sheet of document D delivered from the document transport part 8, and a scanner driving part 20 to drive the scanner 18.

The document transport part 8 is provided with a document tray 14 to load the sheet of document D, a document sensor 15 to detect whether the sheet of document D is loaded in the document tray 14, a document pickup roller 13 to pick up the sheet of document D according to the operation of the document sensor 15, a friction pad 9 to be in contact with the document pickup roller 13 with a predetermined pressure to separate the sheet of document D sheet by sheet. A white roller 17 is provided to transport the picked-up sheet of document D while bringing the picked-up sheet of the document D to be in contact with the scanner 18, and a document discharge roller 19 is provided to discharge the sheets of document D past through the scanner 18 and the white roller 17 out of the machine 1.

The scanner 18 includes a contact image sensor (CIS) (not shown) mounted on a scanner frame 3 to read data out of the sheet of document D.

The scanner driving part 20, which is disposed on the scanner frame 3, includes a scanner driving motor 21, a scanner driving gear 22 formed on the scanner driving motor 21, and a plurality of engaging gears 23, 25, 26, 27, 29, 30, and 32 and a first reduction gear 24 to transmit a rotational force of the scanner driving gear 21 to a document pickup roller gear 28, a white roller gear 31, and a document discharge roller gear 33.

As shown in FIGS. 1, 2 and 4, the printer unit 40 includes a carrier 41 having a print head 43 with an ink jet nozzle mounted thereon, a carrier frame 12 to support a guide rail 11 and a carrier shaft 49 guiding the movement of the carrier 41, a carrier driving part 50 to move the carrier 41 right and left along the carrier shaft 49, a paper transport part 42 to transport a sheet of paper P loaded in a paper cassette 48 and a printer driving part 60 to drive the paper transport part 42.

The carrier 41 is provided with a guide slider 56 formed at a rear and an upper side thereof to be movable right and left along the guide rail 11, and a support bracket 47 supported on the carrier shaft 49 to be movable right and left therealong.

As shown in FIGS. 1 and 2, the carrier driving part 50 includes a carrier driving motor 51 fixed on the carrier frame 12 below the guide rail 11, and a carrier driving belt 53 connected with a carrier driving gear 52 of the carrier driving motor 51 to transmit a power of the carrier driving motor 51 to a power transmitting teeth portion 54 of the support bracket 47 formed at a rear side of the carrier 41, thereby moving the carrier 41 right and left.

The paper transport part 42 includes a paper pickup roller 44 to pick up the sheet of paper P to be printed, a paper transport roller 45 to transport the sheet of paper P picked-up by the paper pickup roller 44, and a paper discharge roller 46 to discharge the sheet of paper P.

The printer driving part 60 includes paper feed driving motor 61 fixed on a lower side of a paper feed frame 5 (FIG. 1), a paper-feed driving gear 62 formed at the paper-feed driving motor 61, and a plurality of engaging gears 63, 65, 66, 67, 69, 70, 71 and 75 and second reduction gears 64, 68 and 73 to transmit the rotation force of the driving motor gear 62 to a paper pickup roller gear 72, paper transport roller gear 74, and a paper discharge roller gear 76.

In operation of the multi-function machine 1 constructed above, during a scanning mode for copying or transmitting the data recorded on the sheet of document P, the scanner driving motor 21 drives the scanner driving part 20 to operate the scanner unit 10, and during a printing mode for printing, the paper-feed driving motor 61 and the carrier driving motor 51 drive, respectively, the printer driving part 60 and the carrier driving part 50 to operate the printer unit 40.

However, such a conventional multi-function machine 1 has an advantage that because the scanner driving part 20 and the printer driving part 60 disposed to have a same power transmitting direction are respectively driven by separate motors 21 and 51, a structure and a method to drive the scanner unit 10 and the printer unit 40 to carry out the scanning and printing operations can be easily embodied. However, a problem exists in the conventional multi-function machine 1 in that a fabrication cost increases owing to a use of two high-priced driving motors.

Also, in the conventional multi-function machine 1, because the scanner driving part 20 or the printer driving part 60 uses the gears 22, 23, 24, 25, 26, 27, 28, 29, 30, 31, 32, and 33, or the gears 62, 63, 64, 65, 67, 68, 69, 70, 71, 72, 73, 75, and 76, there are frequent occasions when a portion of the gears 22, 23, 24, 25, 26, 27, 28, 29, 30, 31, 32, and 33, or 62, 63, 64, 65, 67, 68, 69, 70, 71, 72, 73, 75, and 76 should be mounted on a different support frame instead of the scanner frame 3 or the paper feed frame 5.

In this case, during assembling, the scanner frame 3 or the paper feed frame 5 is apt to be wrongly assembled with the other support frame by the fabrication tolerance.

Thus, when the frames are wrongly assembled with each other, a distance between the frames is varied, so that an engagement between coupled gears mounted on respective frames can become loose, thereby resulting in a problem that the coupled gears are disassembled from each other or worn away by each other during power-transmitting, and a power transmitting performance therebetween is deteriorated.

SUMMARY OF THE INVENTION

Additional aspects and advantages of the invention will be set forth in part in the description which follows and, in part, will be obvious from the description, or may be learned by practice of the invention.

The present invention has been devised to solve the above problems, so it is an aspect of the present invention to provide a driving apparatus of a multi-function machine to drive a scanner driving part of a scanner unit and a printer driving part of a printer unit by one driving motor to reduce a fabrication cost.

It is another aspect of the present invention to provide a power transmitting apparatus to prevent first and second power transmitting gears amounted respectively on a paper feed frame and a scanner frame from being disengaged from each other or worn away by each other, even though the paper feed frame and the scanner frame are wrongly assembled with each other by a fabrication tolerance.

It is still another aspect of the present invention to provide a power switching apparatus to drive a plurality of driving systems, such as a printer driving part and a scanner driving part, by one driving motor by using an actuating lever which is operated by a compulsory pressing member, such as a carrier.

According to one aspect of the present invention to achieve the above aspects and other features of the present invention, the present invention provides a driving apparatus of a multi-function machine, which includes a scanner unit scanning data recorded on a sheet of document, a document transport part to transport the sheet of document, and a printer unit printing the data on a sheet of paper, and a carrier including a print head with an ink jet nozzle mounted thereon to carry out the printing operation by moving the print head, the driving apparatus including: a driving motor; a scanner driving part driving the scanner unit; a printer driving part driving the printer unit; and a power switching part disposed with the driving motor, the scanner driving part, and the printer driving part to selectively transmit a power of the driving motor to at least one of the scanner driving part and the printer driving part.

The power switching part includes a first clutch disposed with the driving motor, the scanner driving part, and the printer driving part to move between a first power transmitting position transmitting the power of the driving motor to the scanner driving part and a second power transmitting position transmitting the power of the driving motor to the printer driving part, and a first actuating lever disposed on a moving path of the carrier and actuated by the carrier to move the first clutch between the first power transmitting position and the second power transmitting position.

The first clutch is provided with a first rotation axis disposed at a frame, a first paper-feed clutch gear disposed at the first rotation axis to engage with the printer driving part, and having first paper-feed clutch teeth formed on a face thereof, a first scanner clutch gear disposed at the first rotation axis to engage with the scanner driving part, and having first scanner clutch teeth formed on a face thereof which is located toward the first paper-feed clutch teeth, a first middle clutch gear disposed at the first rotation axis between the first paper-feed clutch gear and the first scanner clutch gear to engage with the driving motor, and having first homologous paper-feed clutch teeth formed on one face thereof and opposite to the first paper-feed clutch teeth, and engaging to the first paper-feed clutch teeth, and first homologous scanner clutch teeth formed on the other face thereof and opposite to the first scanner clutch teeth, and engaging to the first scanner clutch teeth; and a first clutch spring disposed between the first middle clutch gear and the first scanner clutch gear to elastically urge the first middle clutch gear toward the first paper-feed clutch gear to allow the first homologous paper-feed clutch teeth of the first middle clutch gear to engage with the first paper-feed clutch teeth of the first paper-feed clutch gear. At this time, in accordance with an aspect of the present invention, the first paper-feed clutch teeth, the first scanner clutch teeth, the first homologous paper-feed clutch teeth, and the first homologous scanner clutch teeth are respectively formed of a plurality of teeth, each having a cross section such as a triangle, a rectangle, or a trapezoid to switch the power to be transmitted, where the plurality of teeth are formed at the corresponding faces of the gears.

The first actuating lever has a first one end disposed between the first middle clutch gear and the first paper-feed clutch gear to move between a first paper-feed driving position and a first scanner driving position, the first paper-feed driving position including a position which the first one end allows the first homologous paper-feed clutch teeth to engage with the first paper-feed clutch teeth, and the first scanner driving position including a position which the first one end moves the first middle clutch gear toward the first scanner clutch gear against a force of the first clutch spring to allow the first homologous paper-feed clutch teeth to disengage from the first paper-feed clutch teeth and to allow the first homologous scanner clutch teeth to engage with the first scanner clutch teeth, a first other end disposed on the moving path of the carrier and actuated by the carrier when the carrier is moved, to move the first one end to the first scanner driving position, and a first middle portion having a first support axis supported at the frame to allow the first one end to be moved between the first paper-feed driving position and the first scanner driving position by the first other end.

Alternatively, the power switching part of the present invention may include a second clutch disposed with the driving motor, the scanner driving part, and the printer driving part to move between a third power transmitting position transmitting the power of the driving motor to the printer driving part and a fourth power transmitting position transmitting the power of the driving motor to both the printer driving part and the scanner driving part, and a second actuating lever disposed on a moving path of the carrier and actuated by the carrier, to move the second clutch between the third power transmitting position and the fourth power transmitting position.

In this case, a driving motor gear of the driving motor may include a driving motor gear including first and second gears coaxially disposed in a spaced-apart relation with each other.

If the driving motor gear of the driving motor includes the first and second gears which are coaxially disposed in a spaced-apart relation with each other, the second clutch can be provided with a second rotation axis disposed at a frame, a second paper-feed clutch gear disposed at the second rotation axis to engage with the printer driving part and a first gear of the driving motor, a second scanner clutch gear disposed at the second rotation axis to engage with the scanner driving part, wherein the second scanner clutch gear includes second scanner clutch teeth formed on a face thereof and located toward the second paper-feed clutch gear, a second middle clutch gear disposed at the second rotation axis between the second paper-feed clutch gear and the second scanner clutch gear to engage with or disengage from the second gear of the driving motor, wherein the second middle clutch gear includes second homologous scanner clutch teeth formed on one face thereof and opposite to the second scanner clutch teeth to engage with the second scanner clutch teeth, and a second clutch spring disposed between the second middle clutch gear and the second scanner clutch gear to elastically urge the second middle clutch gear toward the second paper-feed clutch gear, allowing the second middle clutch gear to disengage from the second gear of the driving motor and, at the same time, allowing the second homologous scanner clutch teeth of the second middle clutch gear to disengage from the second scanner clutch teeth of the second scanner clutch gear. At this time, in accordance with an aspect of the present invention, the second scanner clutch teeth and the second homologous scanner clutch teeth are respectively formed of a plurality of teeth, each having a cross section such as a triangle, a rectangle, and a trapezoid to switch the power to be transmitted, and are formed at the corresponding faces of the gears.

Also, the second actuating lever can have a second one end disposed between the second middle clutch gear and the second paper-feed clutch gear to move between a second paper-feed driving position and a first paper-feed/scanner driving position, the second paper-feed driving position including a position which the second one end allows the second middle clutch gear to disengage from the second gear of the driving motor and, at the same time, allows the second homologous scanner clutch teeth to disengage from the second scanner clutch teeth, and the first paper-feed/scanner driving position including a position which the second one end moves the second middle clutch gear toward the second scanner clutch gear against a force of the second clutch spring to allow the second middle clutch gear to engage with the second gear of the driving motor and, at the same time, to allow the second homologous scanner clutch teeth to engage with the second scanner clutch teeth, a second other end disposed on the moving path of the carrier and actuated by the carrier when the carrier is moved, to move the second one end to the first paper-feed/scanner driving position, and a second middle portion having a second support axis supported at the frame to allow the second one end to be movable between the second paper-feed driving position and the first paper-feed/scanner driving position by the second other end.

Further, if the driving motor gear of the driving motor includes the driving motor includes a driving motor gear including an elongated gear extendable in an axial direction, the second clutch can be provided with a frame, wherein the second clutch includes, a third rotation axis disposed at the frame, a third paper-feed clutch gear disposed at the third rotation axis to engage with the printer driving part and one end of the driving motor gear, a third scanner clutch gear disposed at the third rotation axis to engage with the scanner driving part, wherein the third scanner clutch gear includes third scanner clutch teeth formed on a face thereof and located toward the third paper-feed clutch gear, a third middle clutch gear disposed at the third rotation axis between the third paper-feed clutch gear and the third scanner clutch gear to engage with the other end of the driving motor gear of the driving motor, wherein the third middle clutch gear includes third homologous scanner clutch teeth formed on one face thereof and opposite to the third scanner clutch teeth to engage with the third scanner clutch teeth, and a third clutch spring disposed between the third middle clutch gear and the third scanner clutch gear to elastically urge the third middle clutch gear toward the third paper-feed clutch gear to allow the third homologous scanner clutch teeth of the third middle clutch gear to disengage from the third scanner clutch teeth of the third scanner clutch gear. At this time, in accordance with an aspect of the present invention, the third scanner clutch teeth and the third homologous scanner clutch teeth are respectively formed of a plurality of teeth, each having a cross section such as a triangle, a rectangle, or a trapezoid to switch the power to be transmitted, where the plurality of teeth are formed at the corresponding faces of the gears.

Also, the second actuating lever can have a third one end disposed between the third middle clutch gear and the third paper-feed clutch gear to move between a third paper-feed driving position and a second paper-feed/scanner driving position, wherein the third paper-feed driving position includes a position which the third one end allows the third homologous scanner clutch teeth to disengage from the third scanner clutch teeth, and the second paper-feed/scanner driving position includes a position which the third one end moves the third middle clutch gear toward the third scanner clutch gear against a force of the third clutch spring to allow the third homologous scanner clutch teeth to engage with the third scanner clutch teeth, a third other end disposed on the moving path of the carrier and actuated by the carrier when the carrier is moved, to move the third one end to the second paper-feed/scanner driving position, and a third middle portion having a third support axis supported at the frame to allow the third one end to be movable between the third paper-feed driving position and the second paper-feed/scanner driving position by the third other end.

Still further, if the driving motor gear of the driving motor includes the gear having a general width, the second clutch can be provided with a frame, a fourth rotation axis disposed at the frame, a fourth paper-feed clutch gear disposed at the fourth rotation axis to engage with the printer driving part and the driving motor, and having at least a fourth paper-feed clutch tooth formed on one face thereof, a fourth scanner clutch gear disposed at the fourth rotation axis to engage with the scanner driving part, wherein the fourth scanner clutch gear includes fourth scanner clutch teeth formed on a face thereof and located toward the fourth paper-feed clutch tooth, a fourth middle clutch gear disposed at the fourth rotation axis between the fourth paper-feed clutch gear and the fourth scanner clutch gear, wherein the fourth middle clutch gear includes at least a fourth homologous paper-feed clutch tooth formed on an inner circumference surface thereof, opposite to the fourth paper-feed clutch tooth, to engage with the fourth paper-feed clutch tooth, and includes fourth homologous scanner clutch teeth formed on a face thereof, opposite to the fourth scanner clutch teeth, to engage with the fourth scanner clutch teeth, and a fourth clutch spring disposed between the fourth middle clutch gear and the fourth scanner clutch gear to elastically urge the fourth middle clutch gear toward the fourth paper-feed clutch gear to allow the fourth middle clutch gear to separate from the fourth scanner clutch gear. At this time, in accordance with an aspect of the present invention, the fourth paper-feed clutch tooth and the fourth homologous paper-feed clutch tooth are respectively formed of a first sliding boss projected in an axial direction from the one face of the fourth paper-feed clutch gear and a first sliding boss-engaging portion, formed in the inner circumference surface of the fourth middle clutch gear to receive the first sliding boss to be slidable in the axial direction, so that the fourth paper-feed clutch tooth is engaged with the fourth homologous paper-feed clutch tooth to transmit the power of the driving motor. The first sliding boss has a first sliding key or a first sliding tooth formed to be extended in the axial direction on an outer circumference surface thereof, and the first sliding boss-engaging portion includes a first receiving groove formed in a shape corresponding to the first sliding key or the first sliding tooth at the inner circumference surface of the fourth middle clutch gear. Also, in accordance with an aspect of the present invention, the fourth scanner clutch teeth and the fourth homologous scanner clutch teeth are respectively formed of a plurality of teeth, each having a cross section such as a triangle, a rectangle, or a trapezoid to switch the power to be transmitted, where the plurality of teeth are formed at the corresponding faces of the gears.

The second actuating lever can have a fourth one end disposed between the fourth middle clutch gear and the fourth paper-feed clutch gear to move between a fourth paper-feed driving position and a third paper-feed/scanner driving position, the fourth paper-feed driving position including a position which the fourth one end allows the fourth homologous scanner clutch teeth to disengage from the fourth scanner clutch teeth, and the third paper-feed/scanner driving position including a position which the fourth one end moves the fourth middle clutch gear toward the fourth scanner clutch gear against a force of the fourth clutch spring to allow the fourth homologous scanner clutch teeth to engage with the fourth scanner clutch teeth, a fourth other end disposed on the moving path of the carrier and actuated by the carrier when the carrier is moved, to move the fourth one end to the third paper-feed/scanner driving position, and a fourth middle portion having a fourth support axis supported at the frame to allow the fourth one end to be moved between the fourth paper-feed driving position and the third paper-feed/scanner driving position by the fourth other end.

Also, if the driving motor gear of the driving motor includes the gear having a general width, the second clutch can be provided with a frame, a fifth rotation axis disposed at the frame, a fifth paper-feed clutch gear disposed at the fifth rotation axis to engage with the printer driving part and the driving motor, wherein the fifth paper-feed clutch gear includes a fifth paper-feed clutch tooth formed on one face thereof, a fifth scanner clutch gear disposed at the fifth rotation axis to be movable between a paper-feeding position and a paper-feeding/scanning position, wherein the fifth scanner clutch gear includes a fifth scanner clutch tooth formed at an inner circumference surface thereof to engage the fifth paper-feed clutch tooth, and wherein the paper-feeding/scanning position includes a position which the fifth scanner clutch gear is engaged with the scanner driving part and the paper-feeding position includes a position which fifth scanner clutch gear is disengaged from the scanner driving part, and a fifth clutch spring disposed between the fifth scanner clutch gear and a top of the fifth rotation axis to elastically urge the fifth scanner clutch gear toward the fifth paper-feed clutch gear and to maintain the fifth scanner clutch gear at the paper-feeding position. At this time, in accordance with an aspect of the present invention, the fifth paper-feed clutch tooth and the fifth scanner clutch tooth are respectively formed of a second sliding boss, projected in an axial direction from the one face of the fifth paper-feed clutch gear, and a second sliding boss-engaging portion, formed at the inner circumference surface of the fifth scanner clutch gear to receive the second sliding boss, which is slidable in the axial direction, so that the fifth paper-feed clutch tooth is engaged with the fifth scanner clutch tooth to transmit the power of the driving motor. The second sliding boss includes a second sliding key or a second sliding tooth extendable in the axial direction on an outer circumference surface thereof, and the second sliding boss-engaging portion includes a second receiving groove formed in a shape corresponding to the second sliding key or the second sliding tooth at the inner circumference surface of the fifth scanner clutch gear.

Also, the second actuating lever can have a fifth one end disposed between the fifth scanner clutch gear and the fifth paper-feed clutch gear to move between a fifth paper-feed driving position and a fourth paper-feed/scanner driving position, the fifth paper-feed driving position including a position which the fifth one end allows the fifth scanner clutch gear to be maintained at the paper-feeding position, and the fourth paper-feed/scanner driving position including a position which the fifth one end moves the fifth scanner clutch gear toward the scanner driving part against a force of the fifth clutch spring to allow the fifth scanner clutch gear to be maintained at the paper-feeding/scanning position, a fifth other end disposed on the moving path of the carrier and actuated by the carrier when the carrier is moved, to move the fifth one end to the fourth paper-feed/scanner driving position, and a fifth middle portion having a fifth support axis supported at the frame to allow the fifth one end to be moved between the fifth paper-feed driving position and the fourth paper-feed/scanner driving position by the fifth other end.

To facilitate a gear assembling between the power switching part and the scanner driving part, the driving apparatus of the multi-function machine of the present invention further includes a swing gear train disposed between the power switching part and the scanner driving part.

The swing gear train includes a first frame; and a second frame, wherein the swing gear train includes, a swing gear disposed at the first frame to engage with the power switching part mounted on the first frame, a swing lever formed of a V-shaped form and disposed coaxially with the swing gear to rotate on a center of the swing gear, and a pair of idle gears respectively disposed at both ends of the swing lever to be selectively connected with the scanner driving part mounted on the second frame during the rotation of the swing lever.

According to another embodiment of the present invention, the present invention provides a power transmitting apparatus connecting a first gear train mounted on a first frame with a second gear train mounted on a second frame adjacent to the first frame, including a swing gear disposed at a first frame to engage with the first gear train, a swing lever formed of a V-shaped form and disposed coaxially with the swing gear to rotate on a center of the swing gear, and a pair of idle gears respectively disposed at both ends of the swing lever to be selectively connected with the second gear train during the rotation of the swing lever.

The swing lever includes a body including a V-shaped form and including an axis hole formed at a center thereof to receive a support axis of the swing gear; and engaging projections formed at both ends of the body to rotatably support the idle gears.

In accordance with an aspect of the present invention, each of the engaging projections has a cutting portion formed to be cut in a given width at a center of the engaging projection, and an anti-escaping jaw disposed at an upper portion of the engaging projection and having a top end rounded off in a direction which a corresponding one of the idle gears is inserted end and an angled bottom end.

The power transmitting apparatus of the present invention further includes elastic members disposed between the idle gears and the swing lever to contact the idle gears closely to the swing lever, thereby to prevent the idle gears from being shaken. Each of the elastic members is formed of a leaf spring supported around each corresponding engaging projection to be coaxially coupled with one of the corresponding idle gears.

According to still another embodiment of the present invention, the present invention provides a power switching apparatus selectively transmitting a power generated from a driving source into various directions, including a main clutch gear movably disposed at a rotation axis and coupled to the driving source to be rotated on the rotation axis; first and second clutch gears rotatably disposed at the rotation axis to selectively receive the power from the main clutch gear; a clutch spring urging the main clutch gear to engage with the first clutch gear; and a compulsory power switching unit forcibly disengaging the main clutch gear from the first clutch gear and engaging the main clutch gear with the second clutch gear.

The compulsory power switching unit includes an actuating lever rotatably disposed at a frame on which the rotation axis is supported, and having one end interposed between the main clutch gear and the first clutch gear; and a pressing member compulsory rotating the actuating lever to allow the one end of the actuating lever to push the main clutch gear toward the second clutch gear, thereby separating the main clutch gear from the first clutch gear. In accordance with an aspect of the present invention, the pressing member is formed of a carrier of a multi-function machine.

The actuating lever is provided with a lever body rotatably supported at the frame, a power switching end bended at and extended from one end of the lever body to be interposed between the first clutch gear and the main clutch gear and having a hole receiving the rotation axis.

In accordance with an aspect of the present invention, the main clutch gear has clutch teeth formed at both faces thereof, and each of the first and second clutch gears has homologous clutch teeth formed to correspond to the clutch teeth of the main clutch gear.

Also, one of the clutch teeth of the main clutch gear is engaged with the homologous clutch teeth of the first clutch gear, through the hole of the power switching end, and formed at the one end of the lever body, and the power switching end is formed to have a thickness smaller than a sum total in thickness to the one of the clutch teeth of the main clutch gear and the homologous clutch teeth of the first clutch gear.

BRIEF DESCRIPTION OF THE DRAWINGS

The above aspects and/or other advantages of the present invention will become more apparent by describing in detail a preferred aspect thereof with reference to the attached drawings, in which.

DETAILED DESCRIPTION OF THE PREFERRED EMBODIMENTS

Figure 1:
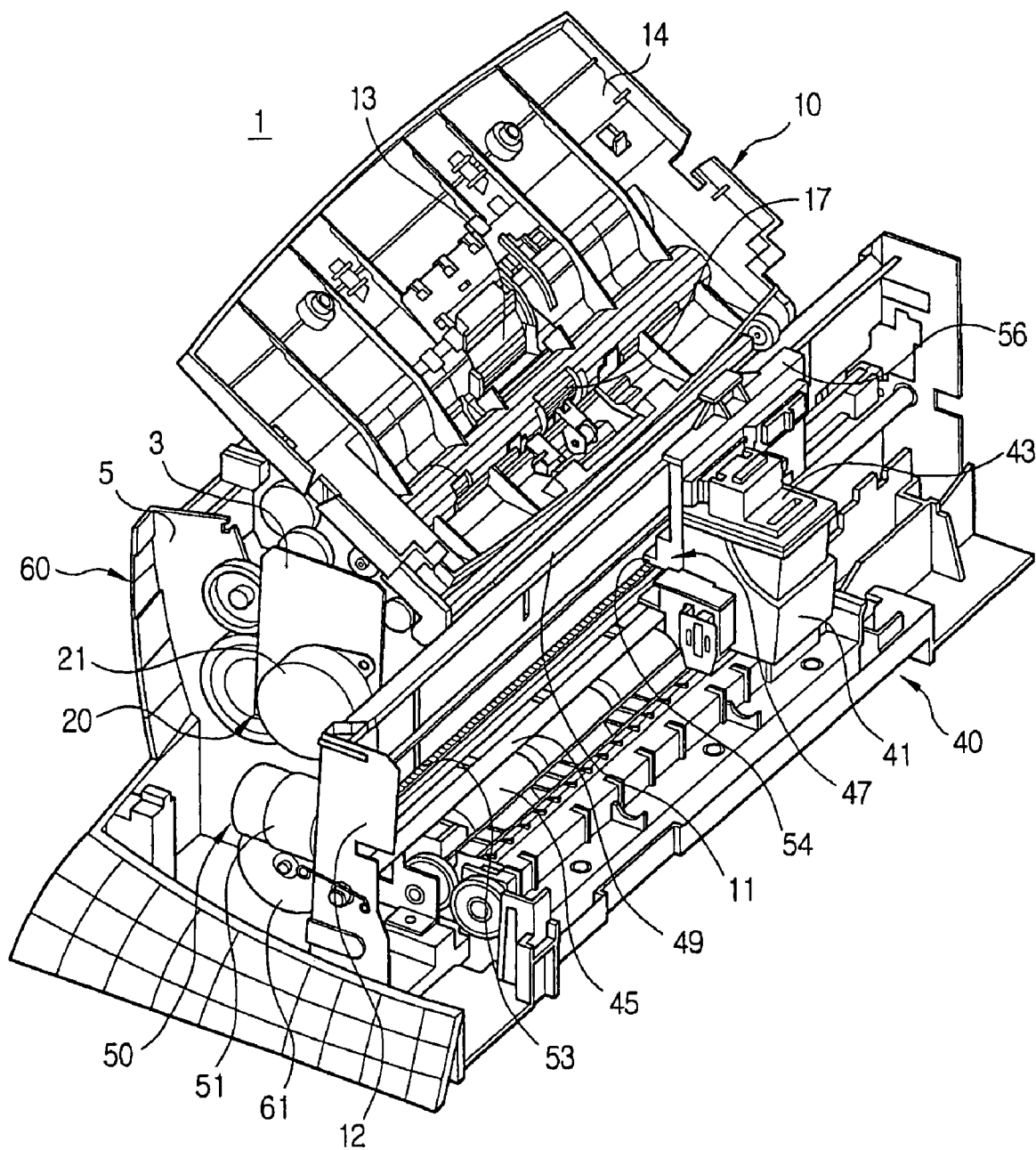
FIG. 1 is a partial perspective view of a general multi-function machine.

Reference will now be made in detail to the present aspects of the present invention, examples of which are illustrated in the accompanying drawings, wherein like reference numerals refer to the like elements throughout. The aspects are described below in order to explain the present invention by referring to the figures.

Hereinafter, a driving apparatus of a multi-function machine according to the present invention will be described in greater detail with reference to the accompanying drawings.

Figure 6:
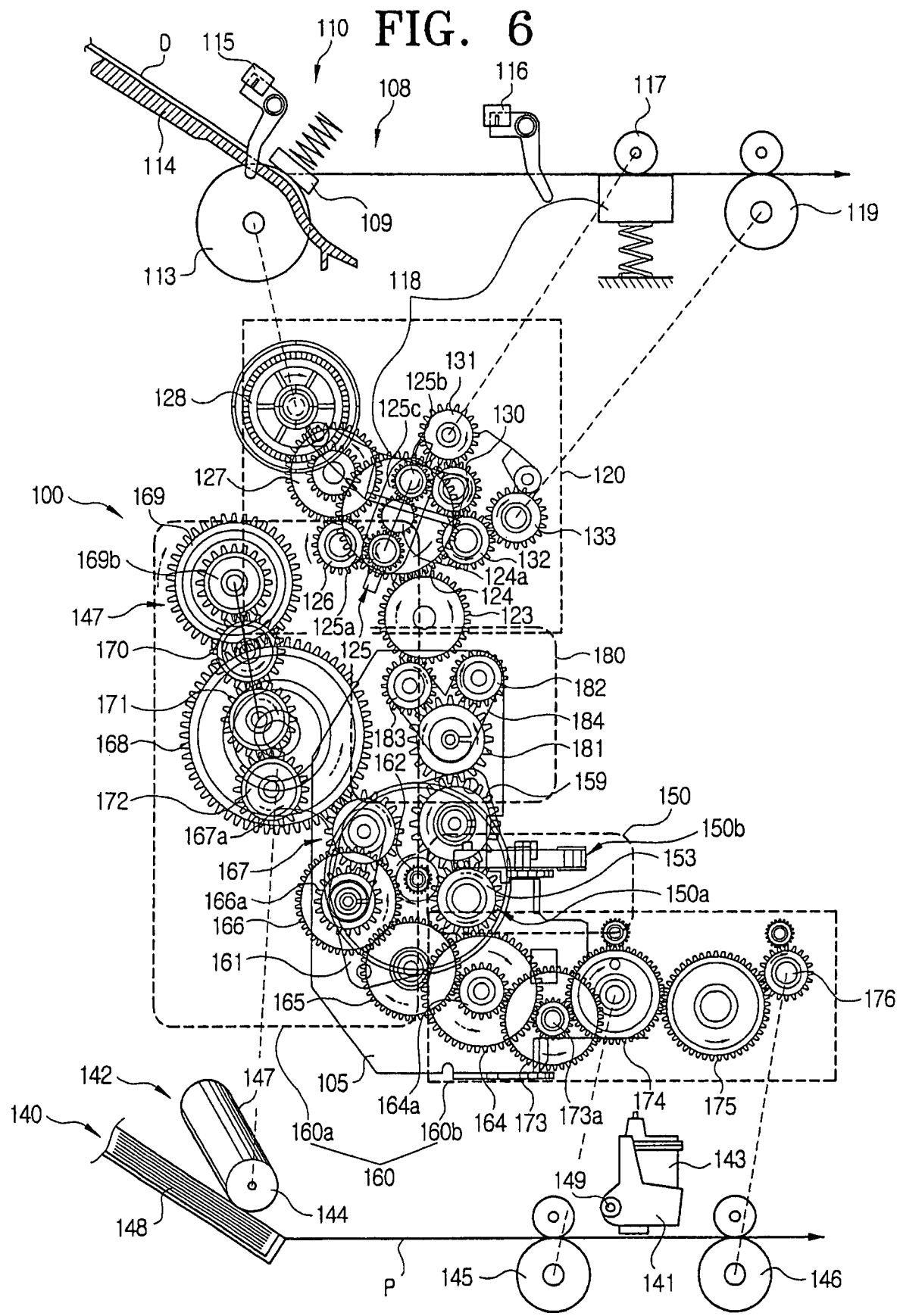
FIG. 6 is a schematic side elevation view of the multi-function machine to which the driving apparatus shown in FIG. 5 is applied.

FIG. 6 shows a multi-function machine to which a driving apparatus 100, according to an aspect of the present invention, is applied.

Figure 2:
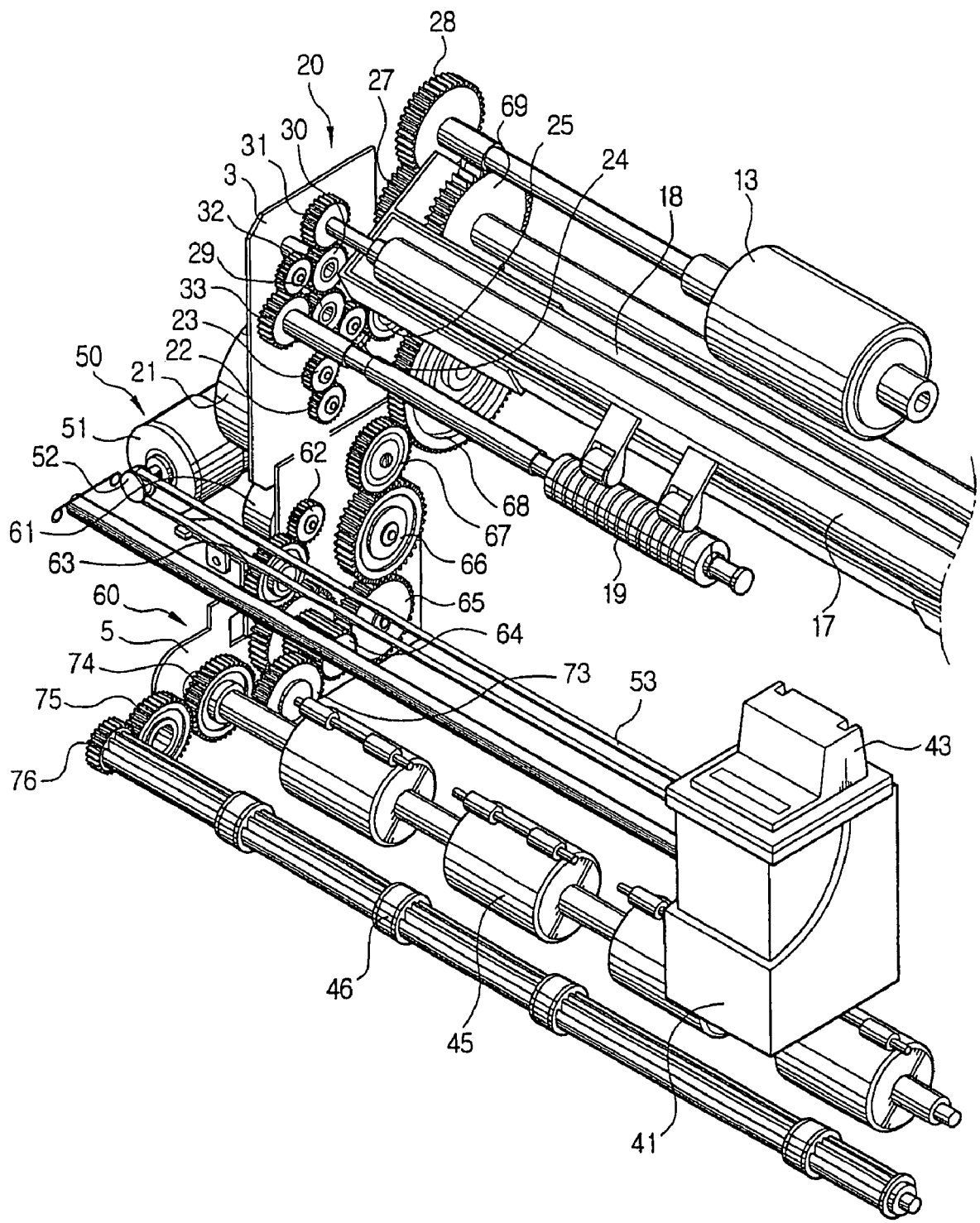
FIG. 2 is a schematic perspective view of a driving apparatus of the multi-function machine shown in FIG. 1.
Figure 3:
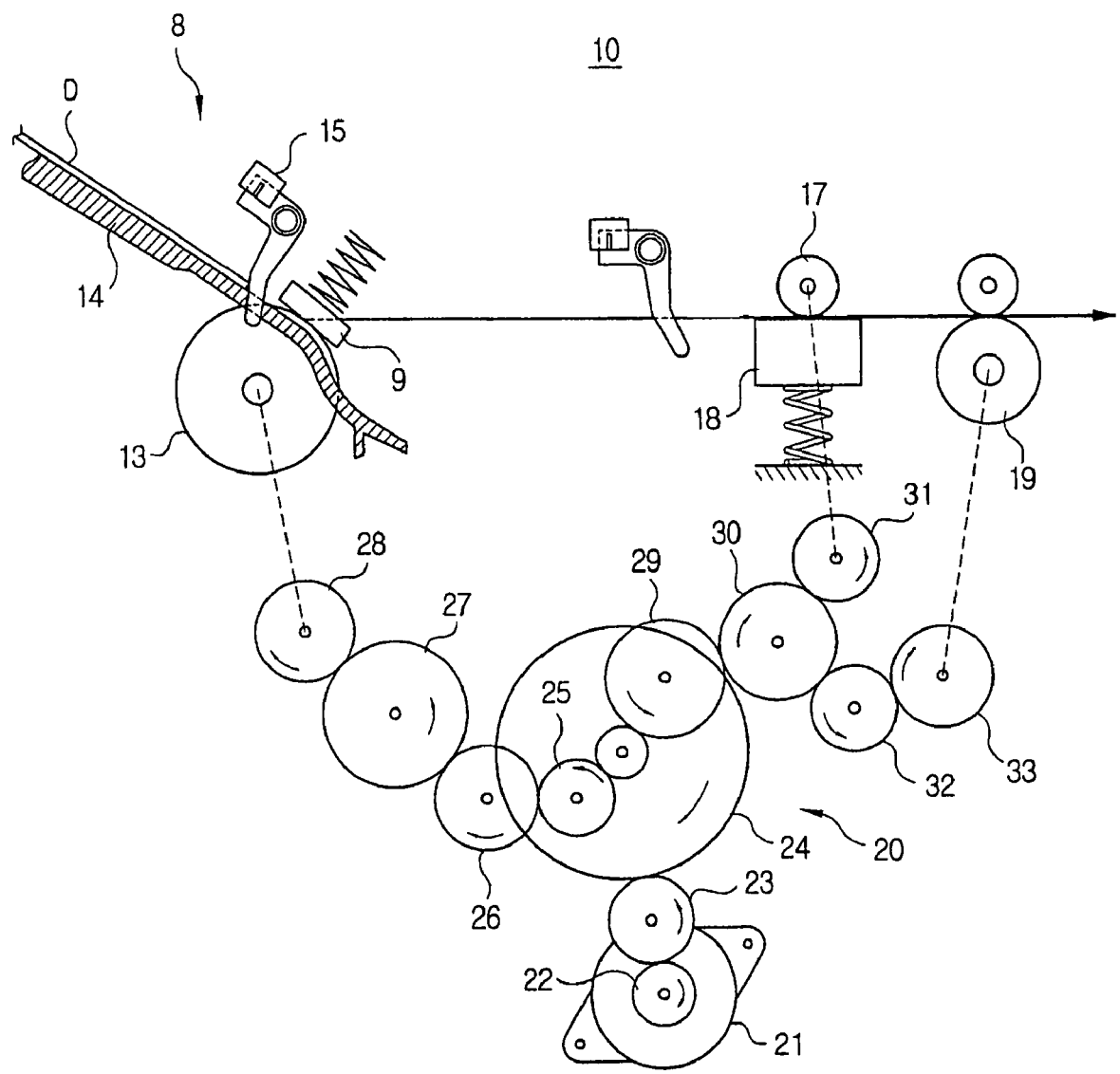
FIG. 3 is a schematic side elevation view of a scanner driving part of the driving apparatus of the multi-function machine shown in FIG. 2.
Figure 4:
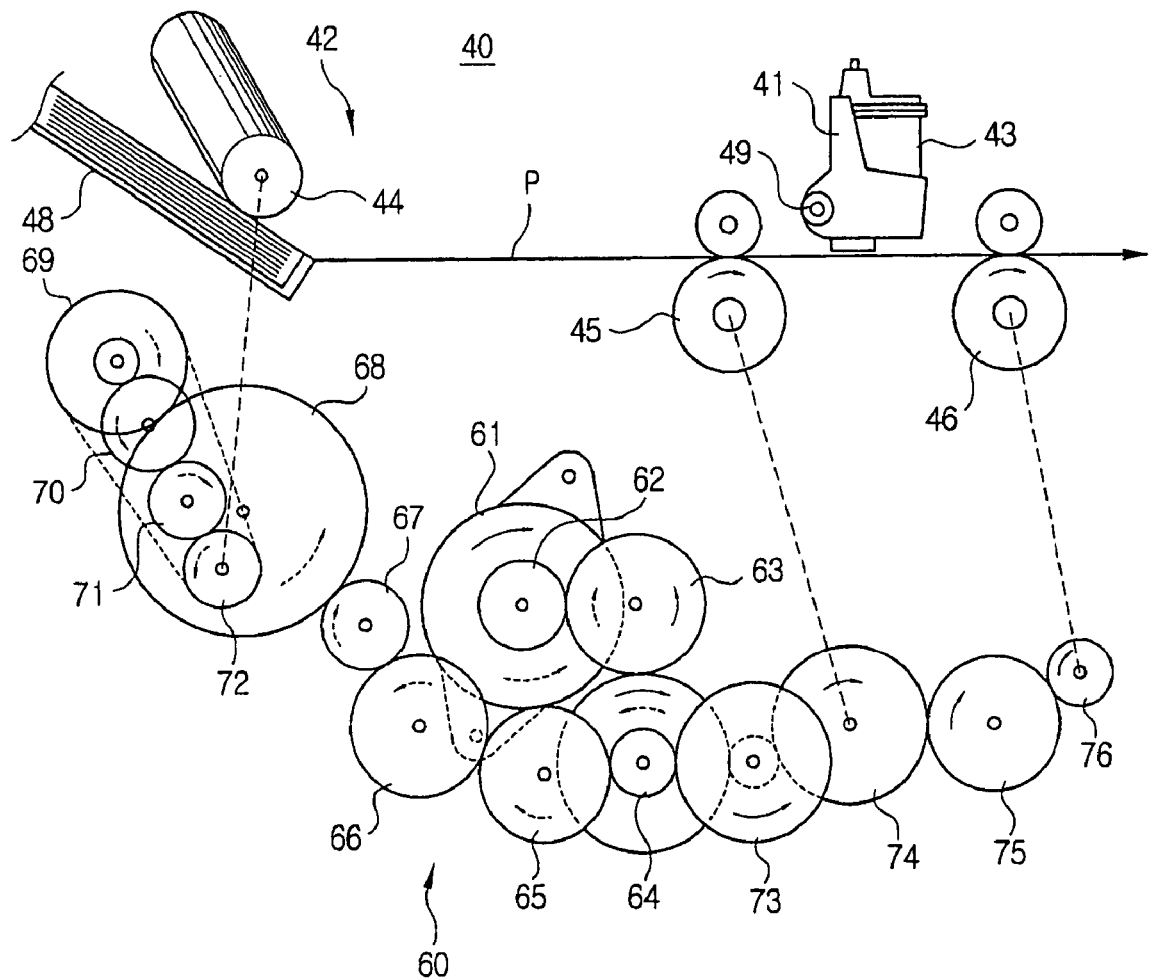
FIG. 4 is a schematic side elevation view of a printer driving part of the driving apparatus of the multi-function machine shown in FIG. 2.

Like as the conventional multi-function machine 1 explained with reference to FIGS. 1 and 2, the multi-function machine has a scanner unit 110 to scan data recorded on a sheet of document D, and a printer unit 140 to print the data on the sheet for an output, as basic components. According to the design, the multi-function machine further includes a facsimile unit (not shown) to copy the data and to transmit or receive the data through communication lines.

As shown in FIG. 6, the scanner unit 110 is provided with a document transport part 108 to transport the sheet of document D, and a scanner 118 to read data out of the sheet of document D delivered from the document transport part 108, and the printer unit 140 is provided with a carrier 141 having a print head 143 with a ink jet nozzle mounted thereon. A carrier driving part (not shown) is also provided to move the carrier 141 right and left along a carrier shaft 149, and a paper transport part 142 is provided to transport a sheet of paper P stacked in a paper cassette 148.

The description about the constructions of the above elements will be omitted here, as they are identical to that of the conventional ones that are described above with reference to FIGS. 1 and 2.

Figure 5:
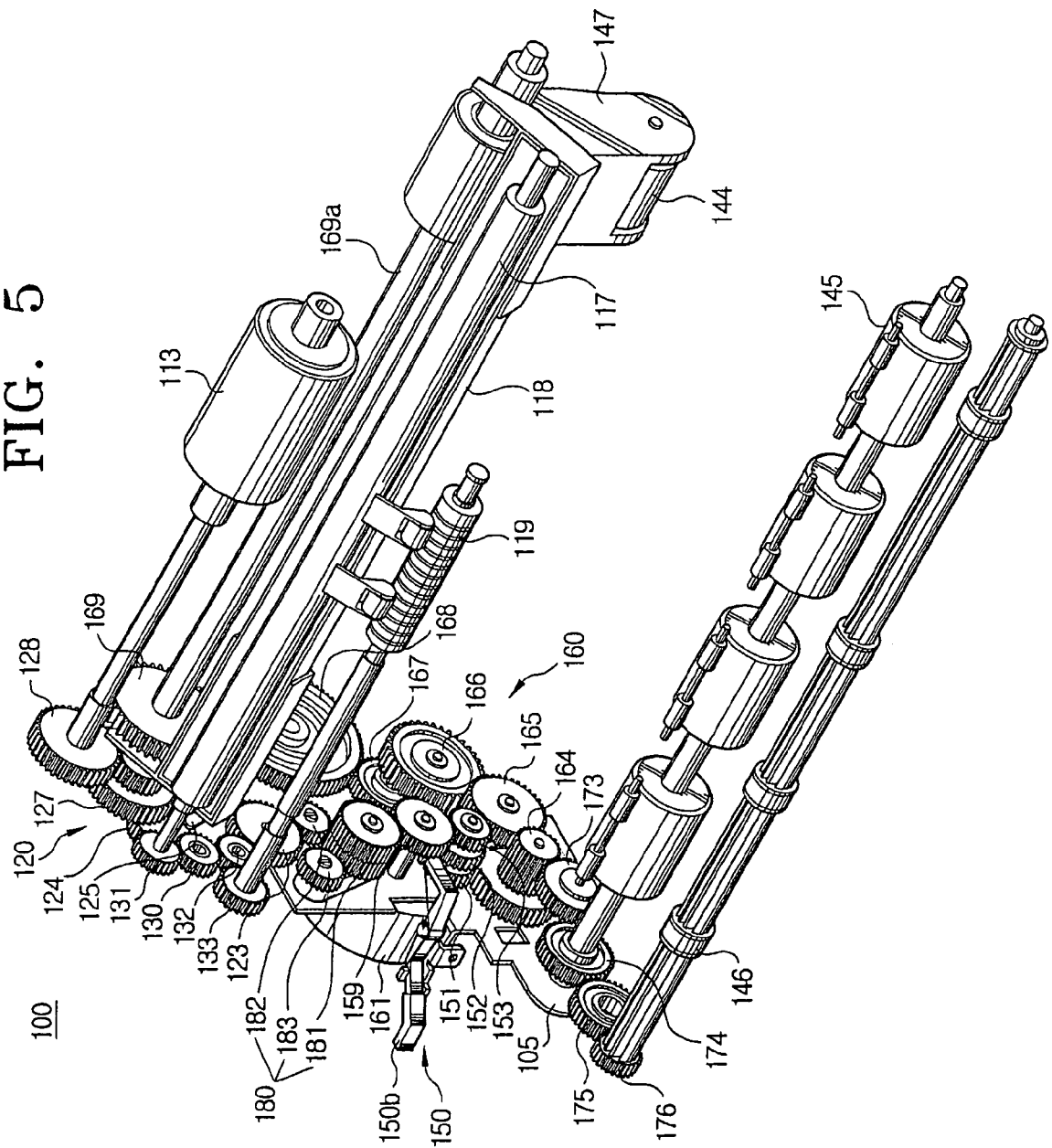
FIG. 5 is a schematic perspective view of the driving apparatus of the multi-function machine, according to an aspect of the present invention.

FIG. 5 schematically shows the driving apparatus 100 of the multi-function machine, according to an aspect of the present invention.

The driving apparatus 100 includes a paper-feed/scanner driving motor 161 disposed at a paper feed frame 105, a scanner driving part 120 to drive the document transport part 108, a printer driving part 160 to drive the paper transport part 142, and a first power switching part 150 disposed with respect to the paper-feed/scanner driving motor 161 to be actuated by the carrier 141, thereby transmitting power of the paper-feed/scanner driving motor 161 to the printer driving part 142 when the carrier 141 is positioned at a printing region, and to the scanner driving part 120 when the carrier 141 is positioned at a non-printing region.

Figure 7:
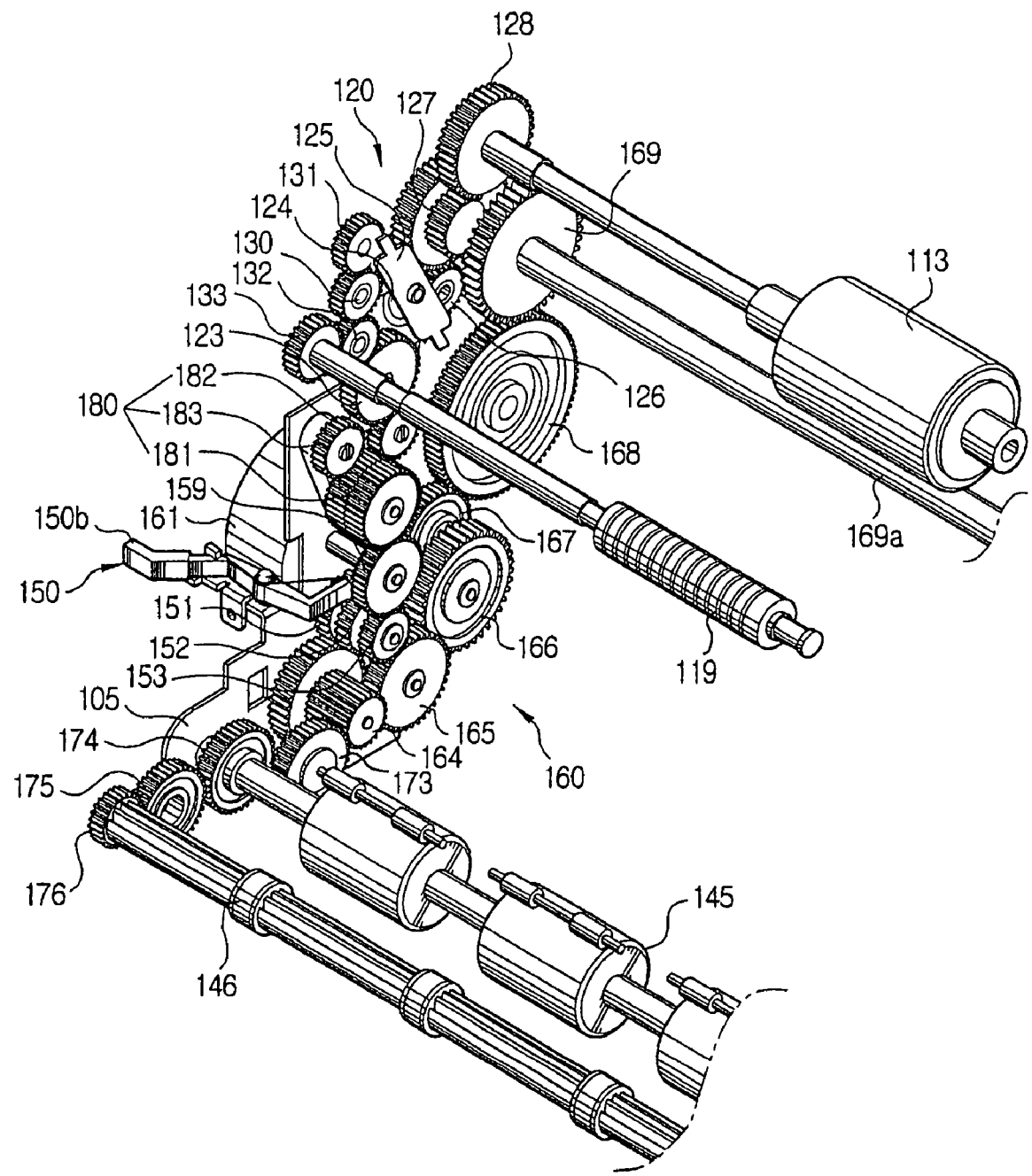
FIG. 7 is a schematic perspective view of the scanner driving part of the driving apparatus shown in FIG. 5.

Referring to FIGS. 6 and 7, the scanner driving part 120 is provided with a first power transmitting gear 159 disposed at the paper feed frame 105 to engage with a first scanner clutch gear 153 of the first power switching part 150 as described later, and a swing gear train 180 disposed at the paper feed frame 105 to engage with the first power transmitting gear 159. The scanner driving part 120 also includes a second power transmitting gear 123 disposed at a scanner frame 105' (FIG. 8) engaging with the swing gear train 180, a first reduction gear 124 disposed at the scanner frame 105' engaging with the second power transmitting gear 123, a satellite gear train 125 engaging with a small gear 124a of the first reduction gear 124, a document pickup gear train 126, 127 and 128 engaging with the satellite gear train 125 to pick up the sheet of document D, and a document transport and discharge gear train 130, 131, 132, and 133 engaging with the satellite gear train 125 to transport and discharge the sheet of document D.

Figure 8:
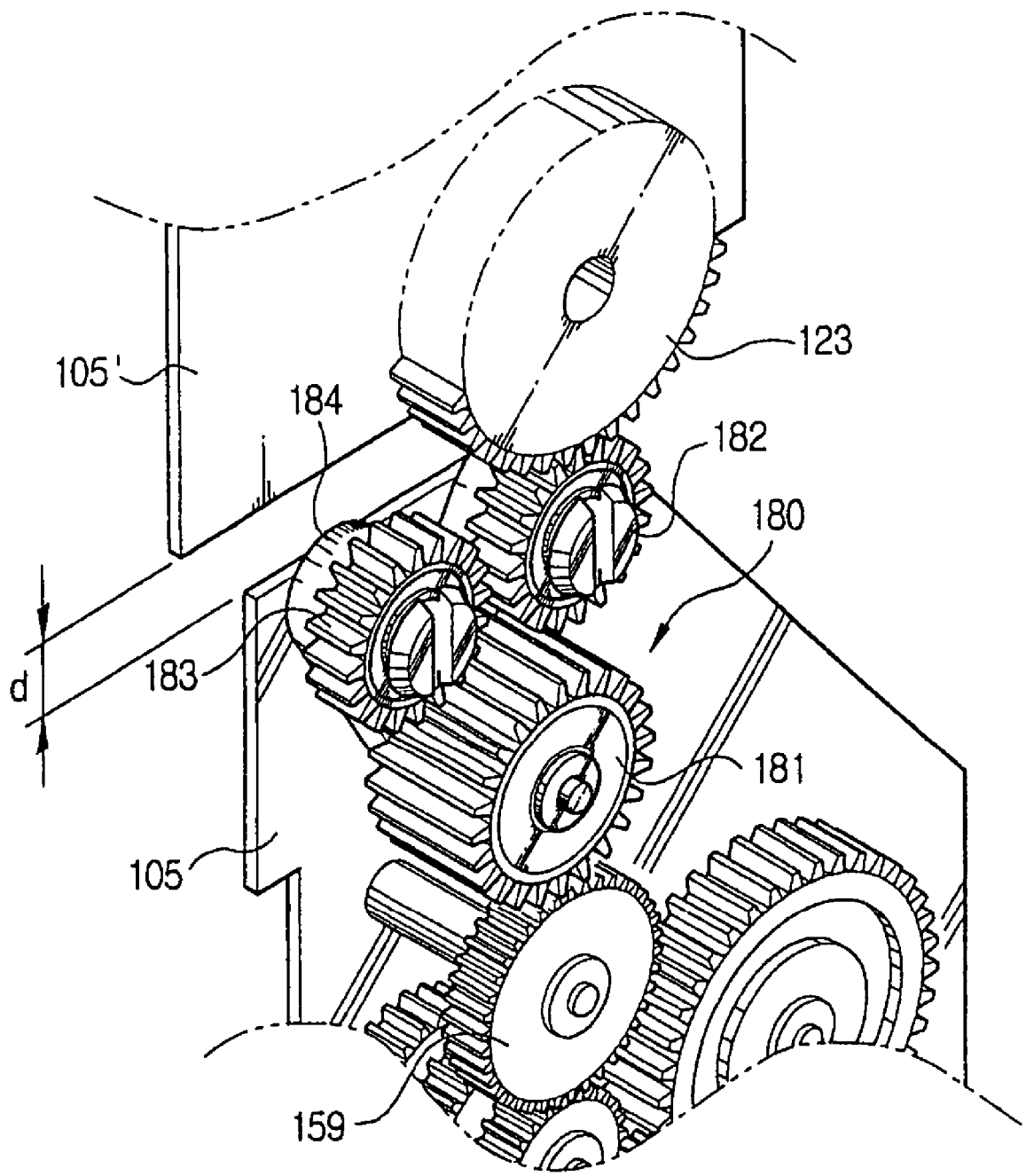
FIG. 8 is a schematic perspective view of a swing gear train of the driving apparatus shown in FIG. 5.
Figure 9:
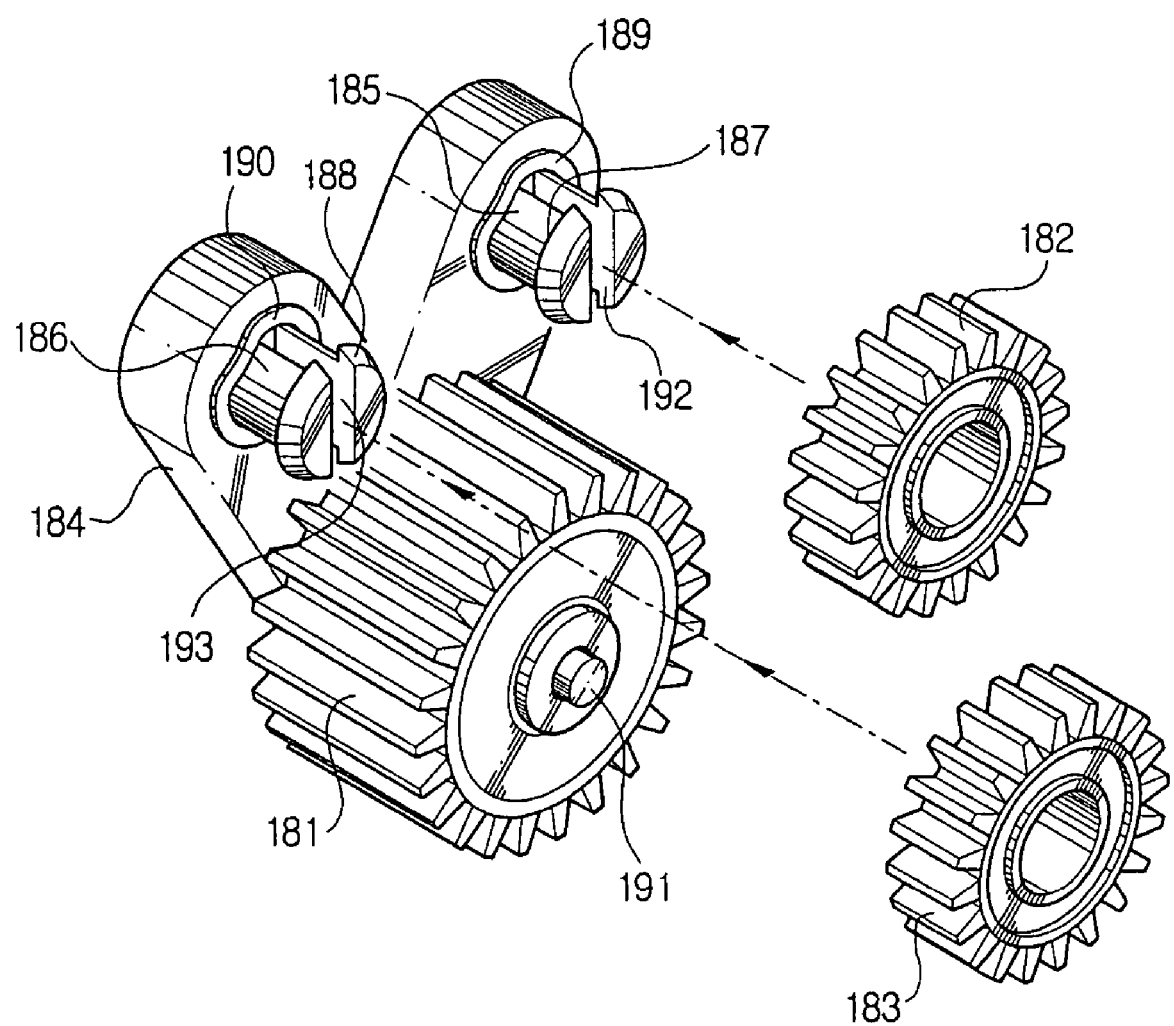
FIG. 9 is an exploded perspective view of the swing gear train of the driving apparatus shown in FIG. 8.

As shown in FIGS. 8 and 9, the swing gear train 180 includes a swing gear 181 engaging with the first power transmitting gear 159, first and second idle gears 182 and 183 engaging with the swing gear 181, and a V-shaped swing lever 184 interconnecting the swing gear 181 and the first and second idle gears 182 and 183 to be engaged with one another. The swing gear 181 together with the swing lever 184 is rotatably disposed at the paper feed frame 105.

The swing lever 184 has a V-shaped body having an axis hole (not shown) formed at a center thereof to receive a support axis 191 of the swing gear 181, and first and second engaging projections 185 and 186 formed at both ends of the V-shaped body to rotatably support the first and second idle gears 182 and 183.

The first and second idle gears 182 and 183 are rotatably disposed on each of the first and second engaging projections 185 and 186. The first and second idle gears 182 and 183 transmit the power of the paper-feed/scanner driving motor 161 to the second power transmitting gear 123 disposed at the scanner frame 105'.

The first and second engaging projections 185 and 186 has respectively first and second anti-escaping jaws 187 and 188, each having a top end rounded off in a direction which the first or second idle gear 182 or 183 is inserted and an angled bottom end.

Also, to easily insert the first and second idle gear 182 and 183, the first and second engaging projections 185 and 186, respectively, have first and second cutting portions 192 and 193 formed by being cut in a given width at a center thereof, so that during the insertion of an first and second idle gear 182 and 183, the first and second engaging projections 185 and 186 can be elastically deformed to easily receive the first and second idle gear 182 and 183.

Around the first and second engaging projections 185 and 186 are disposed first and second elastic members 189 and 190 to elastically support the first and second idle gears 182 and 183, thereby assuring the first and second idle gears 182 and 183 to contact closely to the swing lever 184.

Each of the first and second elastic members 189 and 190 may be form a leaf spring having a donut-shaped body. The first and second elastic members 189 and 190 functions to prevent the first and second idle gears 182 and 183 from being shaken during power-transmitting.

Figure 10A:
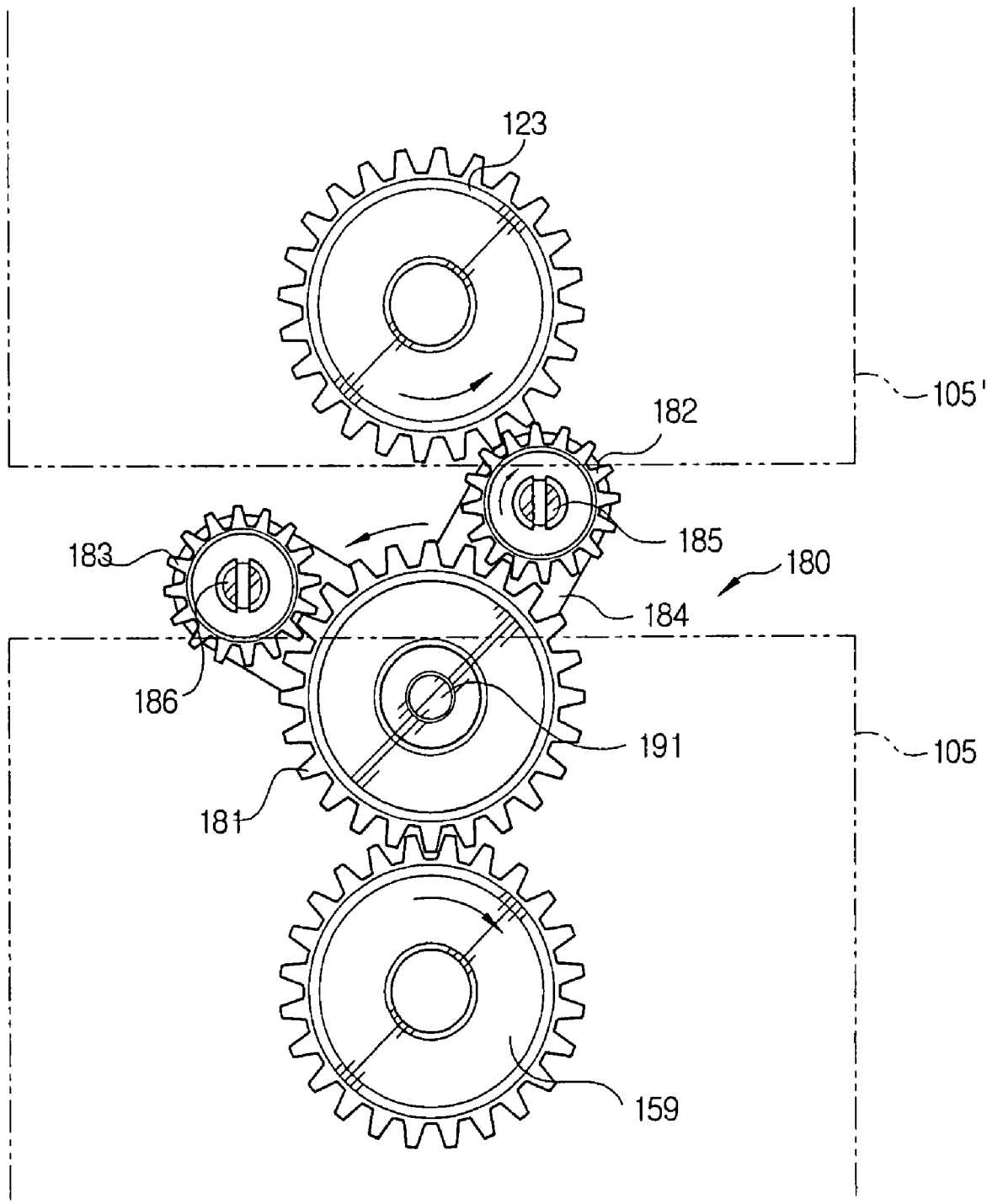
FIGS. 10A and 10B are schematic side elevation views illustrating an operation of the swing gear train of the driving apparatus shown in FIG. 8.

Accordingly, as shown in FIG. 10, when the first power transmitting gear 159 is rotated in a clockwise direction by the rotation of the paper-feed/scanner driving motor 161 in one direction, for example the clockwise direction shown in an arrow of solid line within the first power transmitting gear 159 in FIG. 6, the swing gear 181 engaged with the first power transmitting gear 159 is rotated in a counterclockwise direction, so that the swing lever 184 is rotated in the counterclockwise direction by a momentum generated by the rotation of the swing gear 181.

As the swing lever 184 is rotated in the counterclockwise direction, the first idle gear 182 disposed at one of the both ends of the swing lever 184 comes into contact with the second power transmitting gear 123 and rotates in the clockwise direction.

At this time, because the swing lever 184 is rotated in the counterclockwise direction until the first idle gear 182 comes into contact with the second power transmitting gear 123 to assure that the first idle gear 182 is smoothly engaged with the second power transmitting gear 123, the first power transmitting gear 159 can transmit the power of the paper-feed/scanner driving motor 161 to the second power transmitting gear 123 without being disengaged from or worn away by the second power transmitting gear 123 even though a distance d between the paper feed frame 105 and the scanner frame 105' varies due to a fabrication tolerance.

Figure 10B:
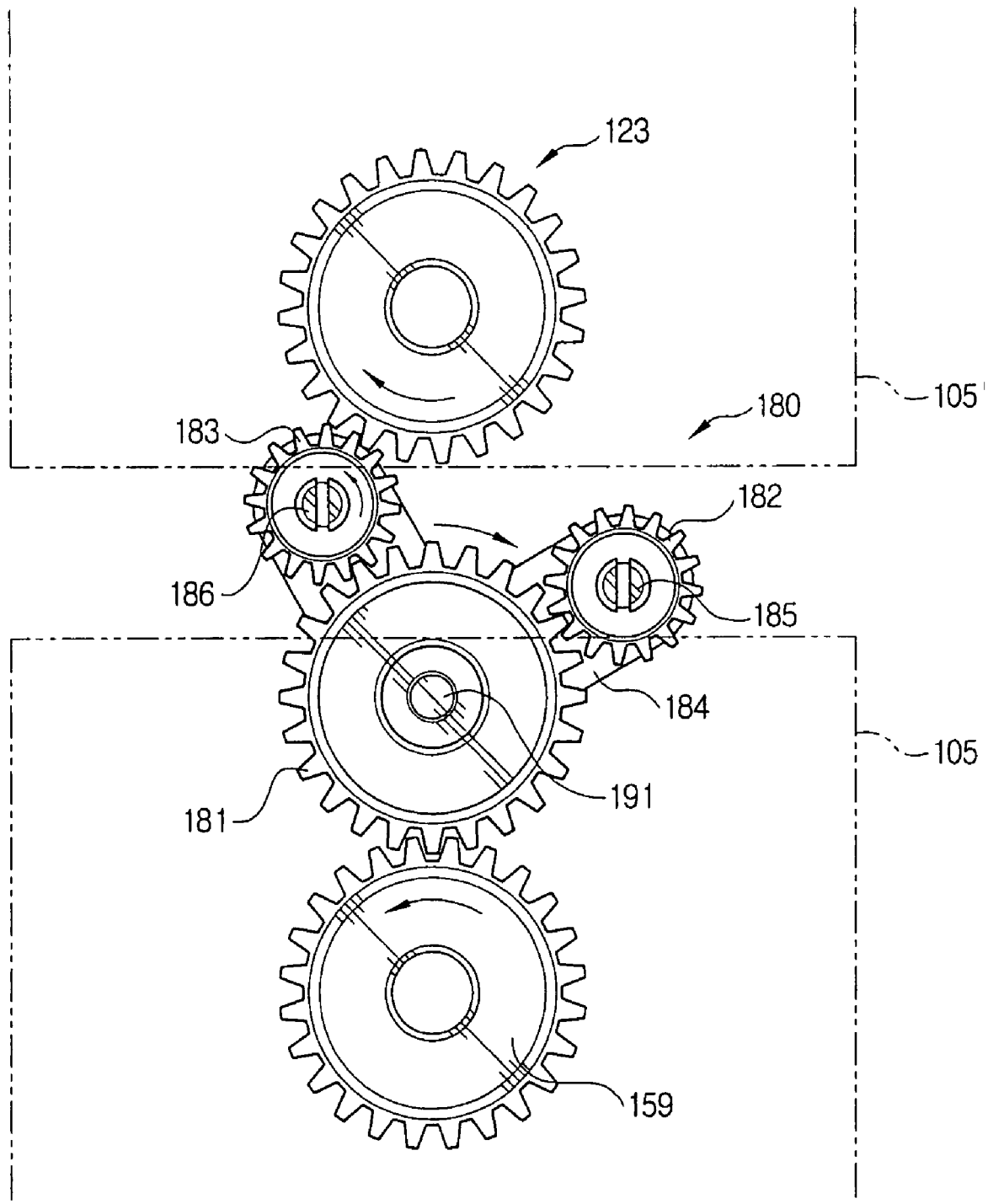

On the other hand, as shown in FIG. 10B, when the first power transmitting gear 159 is rotated in the counterclockwise direction by the paper-feed/scanner driving motor 161, i.e., the counterclockwise direction shown in an arrow of dotted line within the first power transmitting gear 123 in FIG. 6, the swing gear 181 engaged with the first power transmitting gear 159 is rotated in the clockwise direction, so that the swing lever 184 is rotated in the clockwise direction by a momentum generated by the rotation of the swing gear 181.

Thereafter, the second idle gear 183 comes to be engaged with the second power transmitting gear 123 to transmit the power of the paper-feed/scanner driving motor 161 thereto, in the same manner as explained above.

Thus, the swing gear train 180 functions to facilitate the gear assembling between the first power transmitting gear 159 disposed at the paper feed frame 105 and the second power transmitting gear 123 disposed at the scanner frame 105', and also to increase the degree of freedom in design therebetween.

As shown in FIG. 6, the satellite gear train 125 has first and second satellite gears 125a and 125b disposed around the small gear 124a of the second reduction gear 124 to engage therewith, and an I-shaped satellite lever 125c mounting the first and second gears 125a and 125b to engage with the small gear 124a.

The document pickup gear train 126, 127, and 128 includes a third power transmitting gear 126 engaging or disengaging with or from the first satellite gear 125a of the satellite gear train 125 according to the rotation direction of the satellite gear train 125. The document pickup gear train 126, 127, and 128 also includes a fourth power transmitting gear 127 engaging with the third power transmitting gear 126, and a document pickup roller gear 128 coaxially formed with a document pickup roller 113 to transmit the power thereto and to engage with the fourth power transmitting gear 127.

The document transport/discharge gear train 130, 131, 132, and 133 includes a fifth power transmitting gear 130 engaging or disengaging with or from the second satellite gear 125b of the satellite gear train 125 according to the rotation direction of the satellite gear train 125, and a white roller gear 131 disposed on an upper side of the fifth power transmitting gear 130 to engage therewith and coaxially formed with a white roller 117 to transmit the power thereto. The document transport/discharge gear train 130, 131, 132, and 133 also includes a sixth power transmitting gear 132 disposed under the fifth power transmitting gear 130 to engage therewith, and a document discharge roller gear 133 coaxially formed with a document discharge roller 119 to transmit the power thereto and engaging with the sixth power transmitting gear 132.

Accordingly, when the first power transmitting gear 159 of the scanner driving part 120 is rotated in the clockwise direction by the rotation of the paper-feed/scanner driving motor 161 in one direction, i.e., the clockwise direction, the document pickup roller 113 rotates clockwise through the swing gear 181, the first idle gear 182, the second power transmitting gear 123, the small gear 124a of the first reduction gear 124, the first satellite gear 125a, the third and fourth power transmitting gears 126 and 127, and the document pickup roller gear 128 to pick up the sheet of document D. Also, the white roller 117 rotates in the counterclockwise direction through the swing gear 181, the first idle gear 182, the second power transmitting gear 123, the small gear 124a of the first reduction gear 124, the second satellite gear 125b, the fifth power transmitting gear 130, and the white roller gear 131 to transport the sheet of document D in contact with the scanner 118.

Also, at this time, the document discharge roller 119 rotates in the clockwise direction through the swing gear 181, the first idle gear 182, the second power transmitting gear 123, the small gear 124a of the first reduction gear 124, the second satellite gear 125b, the fifth power transmitting gear 130, the sixth power transmitting gear 132, and the document discharge roller gear 133 to discharge the sheet of document D.

On the contrary, when the first power transmitting gear 159 is rotated in the counterclockwise direction by the rotation of the paper-feed/scanner driving motor 161 in the other direction, i.e., the counterclockwise direction, the power transmitted to the satellite gear train 125 through the swing gear 181, the second idle gear 183, the second power transmitting gear 123, and the small gear 124a of the first reduction gear 124 is not transmitted to the document pickup roller 113, the white roller 117, and the document discharge roller 119. Rather, the power is blocked because the first and second satellite gears 125a and 125b are separated respectively from the third and fifth power transmitting gear 126 and 130 as the satellite gear train 125 is rotated in the counterclockwise direction.

Referring again to FIGS. 5 and 6, the printer driving part 160 includes a second reduction gear 164 disposed at the paper feed frame 105 to engage with a first paper-feed clutch gear 151 of the power switching part 150 as described later, a paper pickup gear train 160a engaging with the second reduction gear 164 to pick up the sheet of paper P, and a paper transport/discharge gear train 160b engaging the second reduction gear 164 to discharge the sheet of paper P.

The paper pickup gear train 160a includes a seventh power transmitting gear 165 engaging with a small gear 164a of the second reduction gear 164, a third reduction gear 166 engaging with the seventh power transmitting gear 165, a eighth power transmitting gear 167 having a driven teeth 167a connected with a driving teeth 166a of the third reduction gear 166, and a ninth power transmitting gear 168 engaging with the eighth power transmitting gear 167. The paper pickup gear train 160a also includes paper pickup roller assembly 147 coaxially formed with a tenth power transmitting gear 169 to be connected thereto.

The paper pickup roller assembly 147 has an eleventh power transmitting gear 169b formed on an end opposite to an end of an axis 169a on which the a tenth power transmitting gear 169 is formed, a first pickup idle gear 170 engaging with the eleventh power transmitting gear 169b, a second pickup idle gear 171 engaging with the first pickup idle gear 170, and a paper pickup roller gear 172 coaxially formed with the paper pickup roller 144 to drive the paper pickup roller 144 and engaging with the second pickup idle gear 171.

To idle the paper pickup roller 144 during the paper feeding after the paper picking-up, the paper pickup roller assembly 147 includes a well-known one-way power transmitting device formed at an appropriate position between the paper pickup roller 144 and the paper pickup roller gear 172.

The paper transport/discharge gear train 160b has a fourth reduction 173 engaging with the small gear 164a of the second reduction gear 164, a paper transport gear 174 engaging with a small gear 173a of the fourth reduction gear 173, a twelfth power transmitting gear 175 engaging with the paper transport gear 174, and a paper discharge roller gear 176 engaging with the twelfth power transmitting gear 175.

Accordingly, when the second reduction gear 164 of the printer driving part 160 is rotated in the counterclockwise direction by the rotation of the paper-feed/scanner driving motor 161 in the counterclockwise direction, the paper pickup roller 144 is rotated in the counterclockwise direction through the seventh power transmitting gear 165, the eighth power transmitting gear 167, the ninth power transmitting gear 168, the tenth power transmitting gear 169, the eleventh power transmitting gear 169b, the first and second pickup idle gears 170 and 171, and the paper pickup roller gear 172 to pick up the sheet of paper P.

On the contrary, when the second reduction gear 164 of the printer driving part 160 is rotated in the clockwise direction by the rotation of the paper-feed/scanner driving motor 161 in the clockwise direction, the paper pickup roller 144 is idled by the one-way power transmitting device of the paper pickup roller assembly 147. Further, the paper transport roller 145 is rotated in the clockwise direction through the fourth reduction roller 173 and the paper transport roller gear 174 to transport the sheet of paper P and the paper discharge roller 146 is rotated in the clockwise direction through the fourth reduction gear 173, the paper transport roller gear 174, the twelfth power transmitting gear 175, and the paper discharge roller gear 176 to discharge the sheet of paper P.

Figure 11:
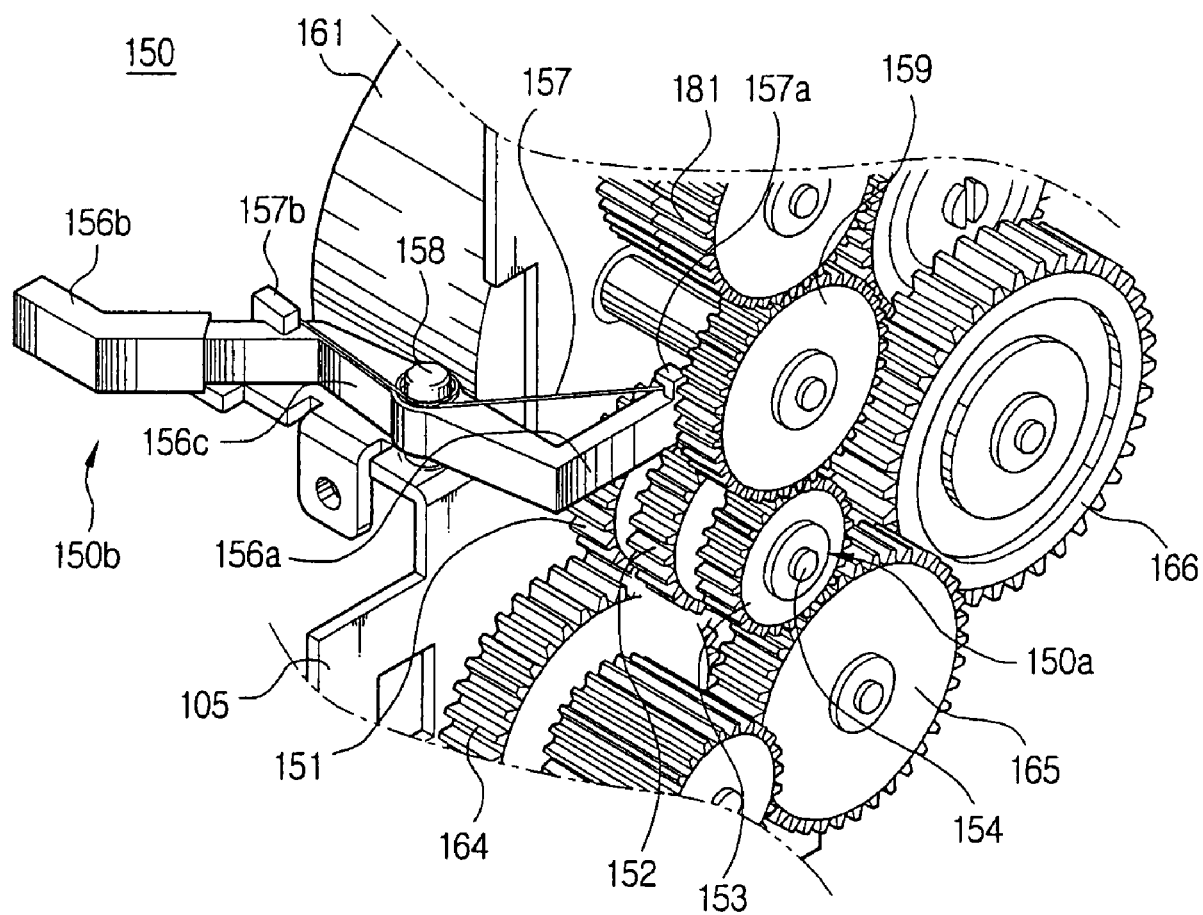
FIG. 11 is a schematic perspective view of a power switching part of the driving apparatus shown in FIG. 5.
Figure 12:
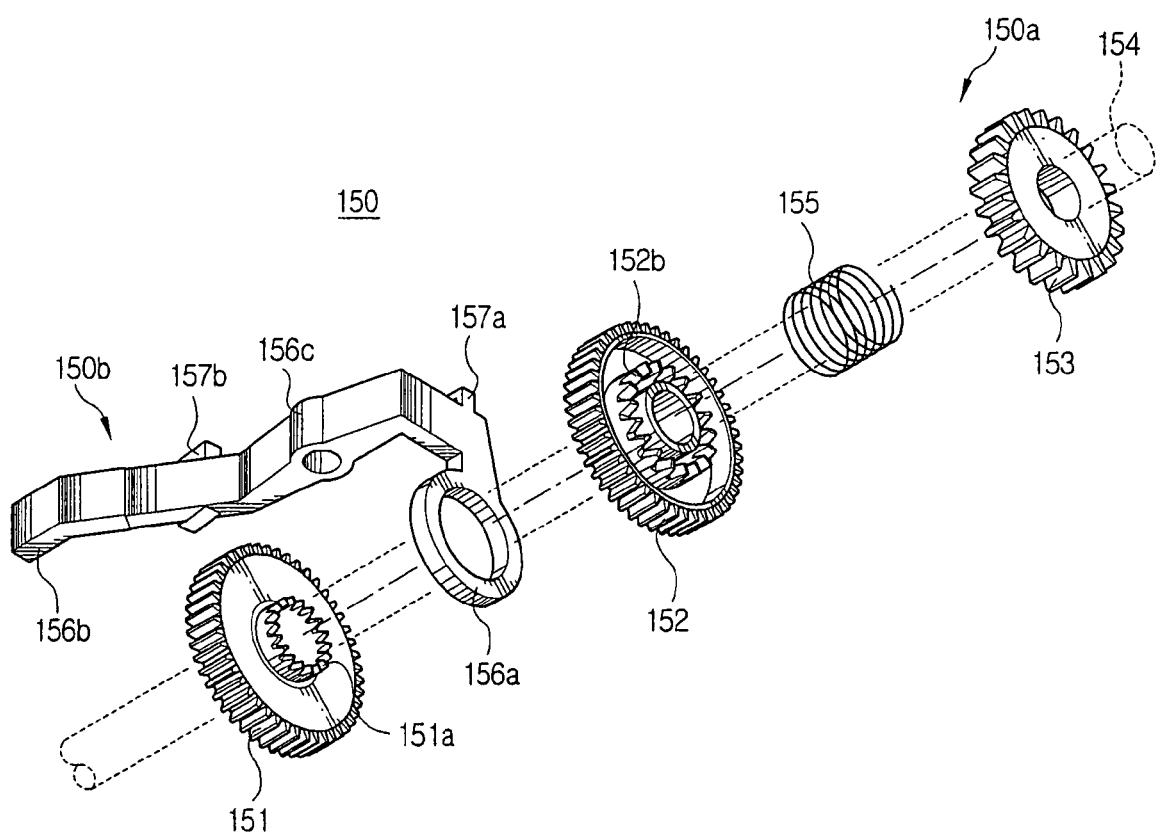
FIGS. 12 and 13 are an exploded perspective view of the power switching part of the driving apparatus shown in FIG. 11.
Figure 13:
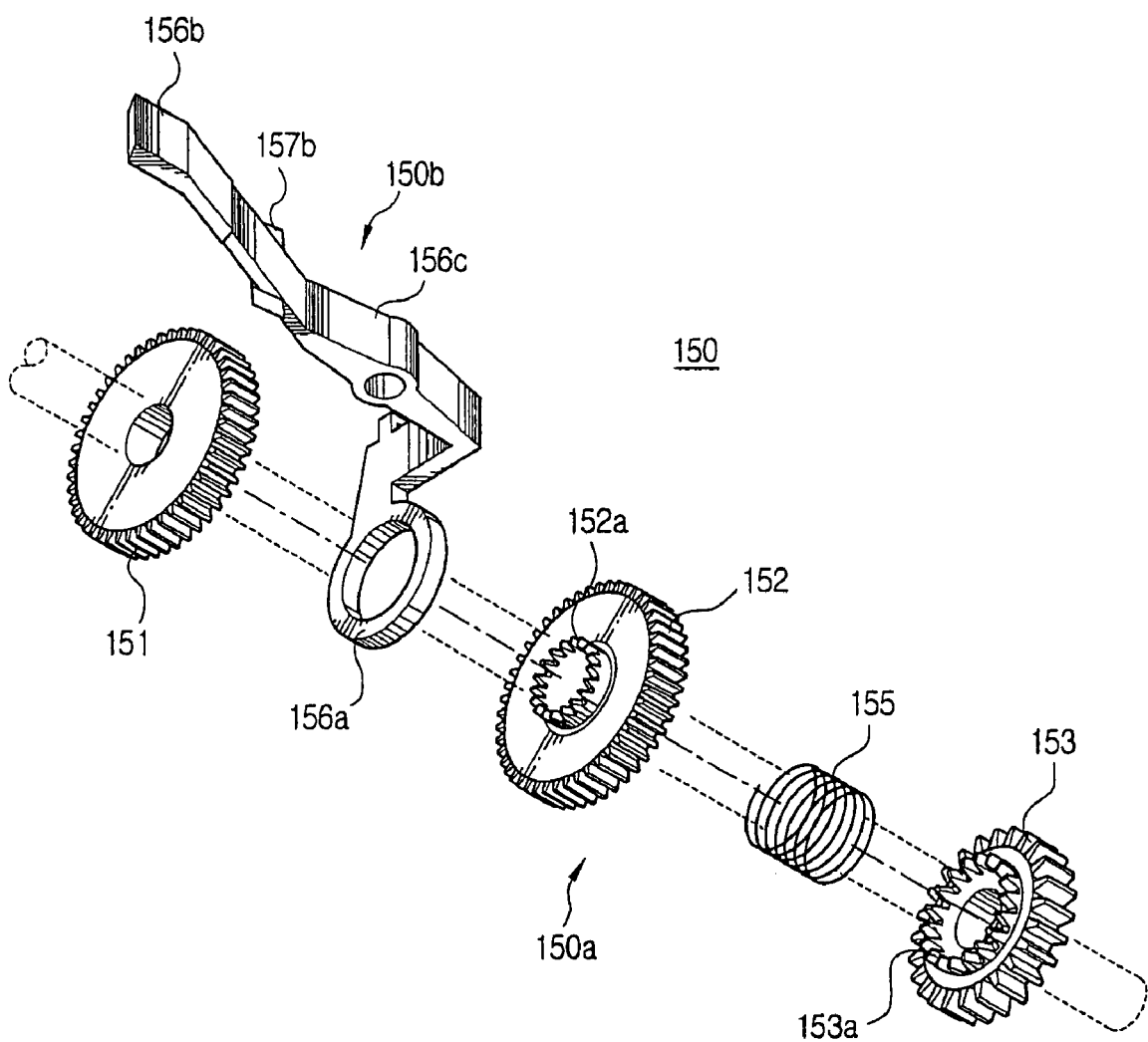

As shown in FIGS. 11, 12, and 13, the first power switching part 150 is provided with a first clutch 150a disposed among the among the driving motor 161, the scanner driving part 120 and the printer driving part 160 to move between a first power transmitting position (FIG. 15), transmitting the power of the driving motor 161 to the first power transmitting gear 159 of scanner driving part 120, and a second power transmitting position (FIG. 14), transmitting the power of the driving motor 161 to the second reduction gear 164 of the printer driving part 160, and a first actuating lever 150b, disposed on a moving path of the carrier 141 to assure the first clutch 150a to be movable between the first power transmitting position (FIG. 15) and the second power transmitting position (FIG. 14) by the carrier 141.

The first clutch 150a includes a first rotation axis 154 disposed at the paper feed frame 105, a first paper-feed clutch gear 151 disposed at the first rotation axis 154 to engage with the second reduction gear 164 of the printer driving part 160 (FIG. 6) and having first paper-feed clutch teeth 151a formed on a face thereof. The first clutch 150a also includes a first scanner clutch gear 153 disposed at the first rotation axis 154 to engage with the first power transmitting gear 159 of the scanner driving part 120 positioned thereon and having first scanner clutch teeth 153a formed on a face thereof which is located toward the first paper-feed clutch teeth 151a. The first clutch 150a includes a first middle clutch gear 152 disposed at the first rotation axis 154 between the first paper-feed clutch gear 151 and the first scanner clutch gear 153 to engage with a driving motor gear 162 of the driving motor 161, and having first homologous paper-feed clutch teeth 152a formed on one face thereof opposite to the first paper-feed clutch teeth 151a to engage therewith and first homologous scanner clutch teeth 152b formed on the other face thereof opposite to the first scanner clutch teeth 153a to engage therewith. A first clutch spring 155 in the first clutch 150a is disposed between the first middle clutch gear 152 and the first scanner clutch gear 153.

The first clutch spring 155 functions to elastically urge the first middle clutch gear 152 toward the first paper-feed clutch gear 151, thereby allowing the first homologous paper-feed clutch teeth 152a of the first middle clutch gear 152 to engage with the first paper-feed clutch teeth 151a of the first paper-feed clutch gear 151.

The first paper-feed clutch teeth 151a, the first scanner clutch teeth 153a, the first homologous paper-feed clutch teeth 152a, and the first homologous scanner clutch teeth 152b are respectively formed of a plurality of teeth, each having a cross section such as a triangle, a rectangle, a trapezoid, and the like to easily switch the power. The teeth are formed at the corresponding faces of the gears 151, 152, and 153 to be engaged or disengaged with each other when the first middle clutch gear 152 is moved in an axial direction on the first rotation axis 154.

In particular, the first paper-feed clutch teeth 151a and the first homologous scanner clutch teeth 152b are formed to be engaged with each other through a hole of a first ring-shaped one end 156a of the actuating lever 150b, to be later described.

Figure 14:
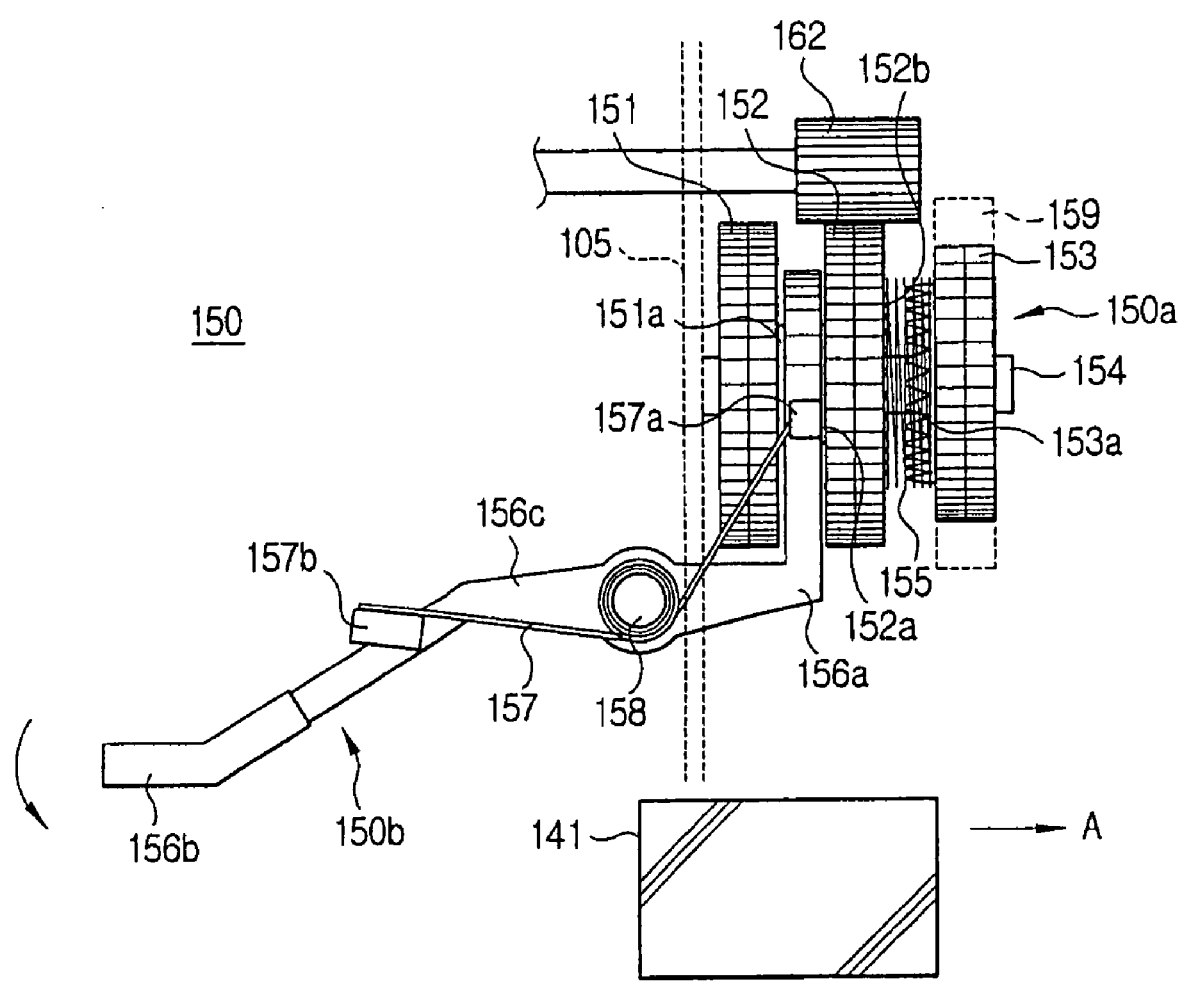
FIGS. 14 and 15 are top plan views illustrating operation of the power switching part of the driving apparatus shown in FIG. 11.
Figure 15:
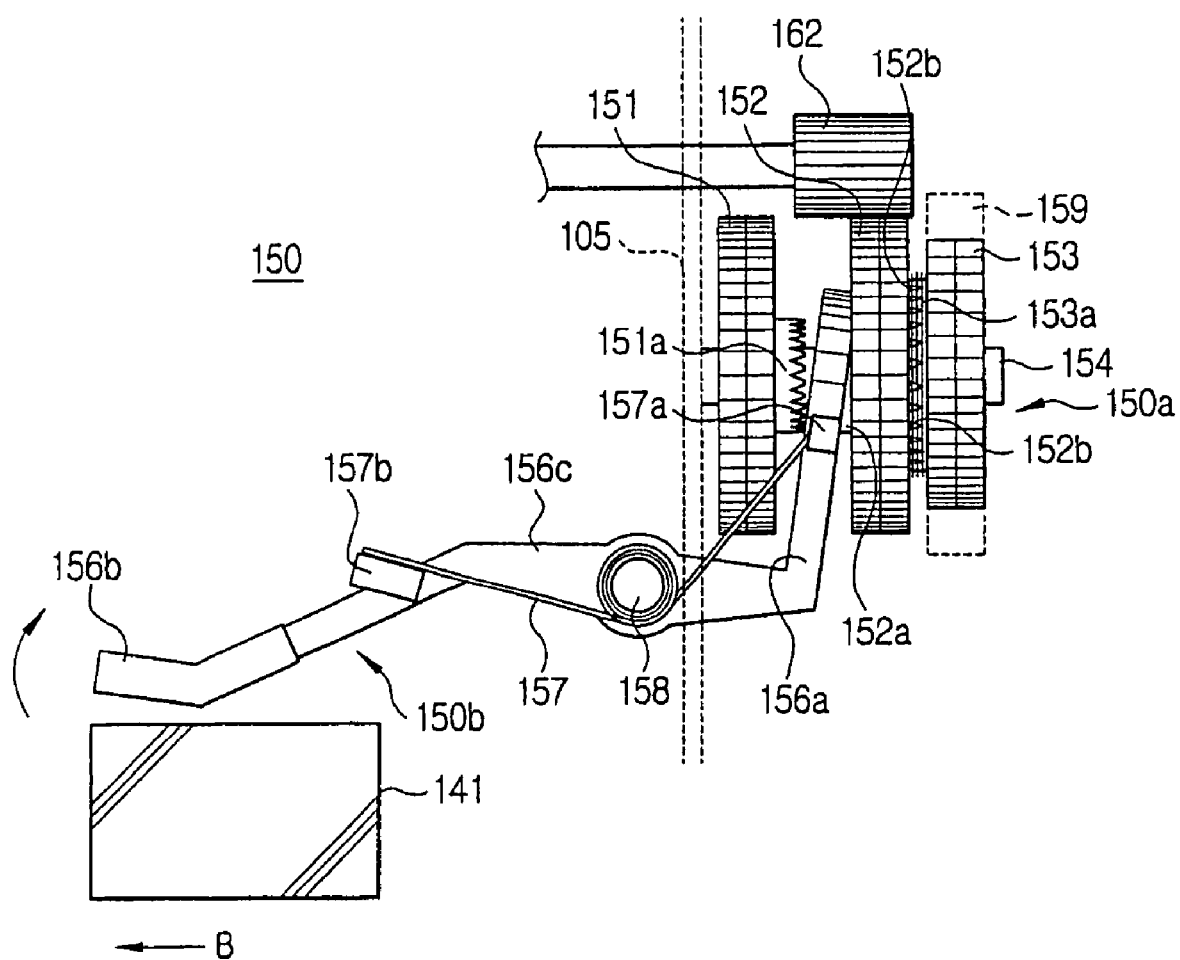

The first actuating lever 150b has a first ring-shaped one end 156a disposed at the first rotation axis 154 between the first middle clutch gear 151 and the first paper-feed clutch gear 152 to move between a first paper-feed driving position (FIG. 14) and a first scanner driving position (FIG. 15). The first ring-shaped one end 156a also has a hole to receive the first rotation axis 154, a first other end 156b disposed on the moving path of the carrier 141 to be actuated by the carrier 141 when the carrier 141 is moved to the non-printing region, to thereby move the first one end 156a to the first scanner driving position. The first ring-shaped one end 156a also has a first middle portion 156c having a first support axis 158 supported at the paper feed frame 105 to allow the first one end 156a to be movable between the first paper-feed driving position (FIG. 14) and the first scanner driving position (FIG. 15) by the first other end 156b.

The first paper-feed driving position is a position which the first one end 156a allows the first homologous paper-feed clutch teeth 152a to engage with the first paper-feed clutch teeth 151a, and the first scanner driving position is a position which the first one end 156a moves the first middle clutch gear 152 toward the first scanner clutch gear 153 against a force of the first clutch spring 155, thereby allowing the first homologous paper-feed clutch teeth 152a to disengage from the first paper-feed clutch teeth 151a and allowing the first homologous scanner clutch teeth 152b to engage with the first scanner clutch teeth 153a.

The first one end 156a is formed to have a thickness smaller than a sum total in thickness of the first paper-feed clutch teeth 151a and the first homologous paper-feed clutch teeth 152a, so that the first paper-feed clutch teeth 151a and the first homologous scanner clutch teeth 152b can be engaged with each other through the hole of the first one end 156a.

The first actuating lever 150b is always maintained at the first paper-feed driving position by a first support spring 157 (FIG. 11) having both ends supported by first and second support protrusions 157a and 157b (FIGS. 11 and 12) and a middle portion fixed on the first support axis 158 (FIG. 11).

Accordingly, the first actuating lever 150b together with the carrier 141 functions to actuate the first clutch 150a, thereby compulsorily switching the power of the paper-feed/scanner driving motor 161 to the printer driving part 160 or the scanner driving part 120.

More specifically, as shown in FIG. 14, when a carrier 141 is moved in the direction of arrow A and positioned at the printing region, the first actuating lever 150b is positioned by the first support spring 157 at the first paper-feed driving position and the first clutch spring 155, so that the first homologous paper-feed clutch teeth 152a of the first middle clutch gear 152 is engaged with the first paper-feed clutch teeth 151a of the first paper-feed clutch gear 151 to transmit the power of the paper-feed/scanner driving motor 161 to the second reduction gear 164 of the printer driving part 160.

To the contrary, as shown in FIG. 15, when the carrier 141 is moved in a direction of arrow B and positioned at the non-printing region, the first actuating lever 150b is rotated by the carrier 141 in the clockwise direction about the first support axis 158 to move the first middle clutch gear 152 toward the first scanner clutch gear 153 against the first support spring 157 and the first clutch spring 155. The first actuating lever 150b is then positioned at the first scanner driving position, so that the first homologous paper-feed clutch teeth 152a of the first middle clutch gear 152 is disengaged from the first paper-feed clutch teeth 151a of the first paper-feed clutch gear 151. At the same time, the first homologous scanner clutch teeth 152b of the first middle clutch gear 152 is engaged with the first scanner clutch teeth 153a of the first scanner clutch gear 153 to transmit the power of the paper-feed/scanner driving motor 161 to the first power transmitting gear 159 of the scanner driving part 120.

The operations of the driving unit 100 of the present invention structured above will be described with reference to FIG. 5 to FIG. 15.

First, assuming that the carrier 141 is positioned at the non-printing region as shown in FIG. 15, the first actuating lever 150b is positioned at the first scanner driving position, where the first homologous paper-feed clutch teeth 152a is separated from the first paper-feed clutch teeth 151a so as not to transmit the power of the paper-feed/scanner driving motor 161 to the second reduction gear 164. The first homologous scanner clutch teeth 152b is engaged with the first scanner clutch teeth 153a to transmit the power of the paper-feed/scanner driving motor 161 to the first power transmitting gear 159 of the scanner driving part 120.

At this state, as shown in FIG. 6, to copy or the transmit data recorded in the sheet of document D, when the sheet of document D is loaded in the document tray 111, the sheet of document D slides down due to a weight of the sheet of document D and operate the document sensor 115. As a result, the controller (not shown) applies electric power to the paper-feed/scanner driving motor 161 so that the driving motor gear 162 rotates in one way, for example, by the clockwise direction indicated in the arrow of solid line in the driving motor gear 162 of FIG. 6.

The driving force of the driving motor gear 162 in the clockwise direction is transmitted to the document pickup roller 113 through the first middle clutch gear 152, the first scanner clutch gear 153, the first power transmitting gear 159, the swing gear 181, the first idle gear 182, the second power transmitting gear 123, the small gear 124a of the first reduction gear 124, the first satellite gear 125a, the third and fourth power transmitting gears 126 and 127, and the document pickup roller gear 128. Accordingly, the document pickup roller 113 is rotated in the clockwise direction to pick up and feed the sheet of document D until the sheet arrives at a document sensor 116.

After the sheet of document D arrives at the document sensor 116 to actuate the document sensor 116, the controller stops the driving motor 161.

Thereafter, when a copy or electrical transmission button is pushed, the controller again rotates the driving motor 161 in the clockwise direction to convey the sheet of document D at a certain traveling distance per one revolution toward the scanner 118.

When the sheet of document D arrives at the scanner 118, the white roller 117, which is rotated in the counterclockwise direction through the first middle clutch gear 152, the first scanner clutch gear 153, the first power transmitting gear 159, the swing gear 181, the first idle gear 182, the second power transmitting gear 123, the small gear 124a of the first reduction gear 124, the second satellite gear 125b, the fifth power transmitting gears 130, and the white roller gear 131 move the sheet of document in contact with the scanner 118 toward the document discharge roller 119.

At this time, the scanner 118 reads the data from the sheet of document D to output the data to an image processing circuit (not shown). The image processing circuit corrects, codes, and compresses the data output from the scanner 118, and then transmits the data to the printer unit or the facsimile unit to print or transmit.

Thus, when the scanner 118 finishes reading the data from the sheet of document D, the sheet of document D is discharged by the document discharge roller 119 to which the rotation force of the driving motor 161 is transmitted through the first middle clutch gear 152, the first scanner clutch gear 153, the first power transmitting gear 159, the swing gear 181, the first idle gear 182, the second power transmitting gear 123, the small gear 124a of the first reduction gear 124, the fifth and sixth power transmitting gears 130 and 132, and the document discharge roller gear 133.

After that, if a print command is issued from the controller or PC, the carrier 141 having the print head 143 mounted thereon moves in the direction of arrow A indicated in FIG. 14, i.e., to the printing region, along a carrier shaft (not shown) and a guide rail (not shown) by a carrier driving gear (not shown), a carrier driving belt (not shown) and a power transmitting teeth portion (not shown), which transmit the power of a carrier driving motor (not shown).

Consequently, as shown in FIG. 14, the first actuating lever 150b is rotated in the counterclockwise direction by the support spring 157 and the first clutch spring 155. The first actuating lever 150b is then positioned at the first paper-feed driving position, which the first homologous clutch teeth 152b of the first middle clutch gear 152 is disengaged from the first scanner clutch teeth 153a and the first homologous paper-feed clutch teeth 152a is engaged with the first paper-feed clutch teeth 151a of the first paper-feed clutch gear 151. Accordingly, the power of the paper-feed/scanner driving motor 161 is not transmitted to the first power transmitting gear 159 of the scanner driving part 120, but to the second reduction gear 164 of the printer driving part 160.

At this state, the paper-feed/scanner driving motor 161 drives the driving motor gear 162 to rotate in the counterclockwise direction indicated in the arrow of dotted line of FIG. 6.

As a result, the paper pickup roller 144 rotates in the counterclockwise direction through the first middle clutch gear 152, the first paper-feed clutch gear 151, the second reduction gear 164, the seventh, eighth, ninth, tenth and eleventh power transmitting gear 165, 167, 168, 169 and 169b, the first and second pickup idle gear 170 and 171, and the paper pickup roller gear 172, and, accordingly, the sheet of paper P is picked up from the paper cassette 148 and transported toward the paper transport roller 145.

Subsequently, when the paper sensor (not shown) senses the sheet of paper P conveyed to the paper transport roller 145, the controller again drives the paper-feed/scanner driving motor 161 in the other way, i.e., the clockwise direction indicated by the arrow of solid line of FIG. 6.

Consequently, the paper pickup roller 144 is idled by the one-way power transmitting device of the paper pickup roller assembly 147. In turn, the paper transport roller 145 is rotated in the clockwise direction through the first middle clutch gear 152, the first paper-feed clutch gear 151, the second and fourth reduction gears 164 and 173, and the paper transport roller gear 174 to convey the sheet of paper P at a certain traveling distance, per one revolution, toward the print head 143.

Subsequently, when the sheet of paper P passes under the print head 143 by the paper transport roller 145, the print head 143 jets ink through the ink jet nozzle to carry out the printing operation, while moving right and left along the carrier shaft 149 and the guide rail by the carrier driving gear, the carrier driving belt and the power transmitting teeth portion, which transmit the power of the carrier driving motor.

After printing, the sheet of paper P is discharged outside by the paper discharge roller 146 to which the rotation force of the driving motor 161 is transmitted through the driving motor gear 162, the first middle clutch gear 152, the first paper-feed clutch gear 151, the first and fourth reduction gears 164 and 173, the paper transport roller gear 174, the twelfth power transmitting gear 175, and the paper discharge roller gear 176.

Figure 16:
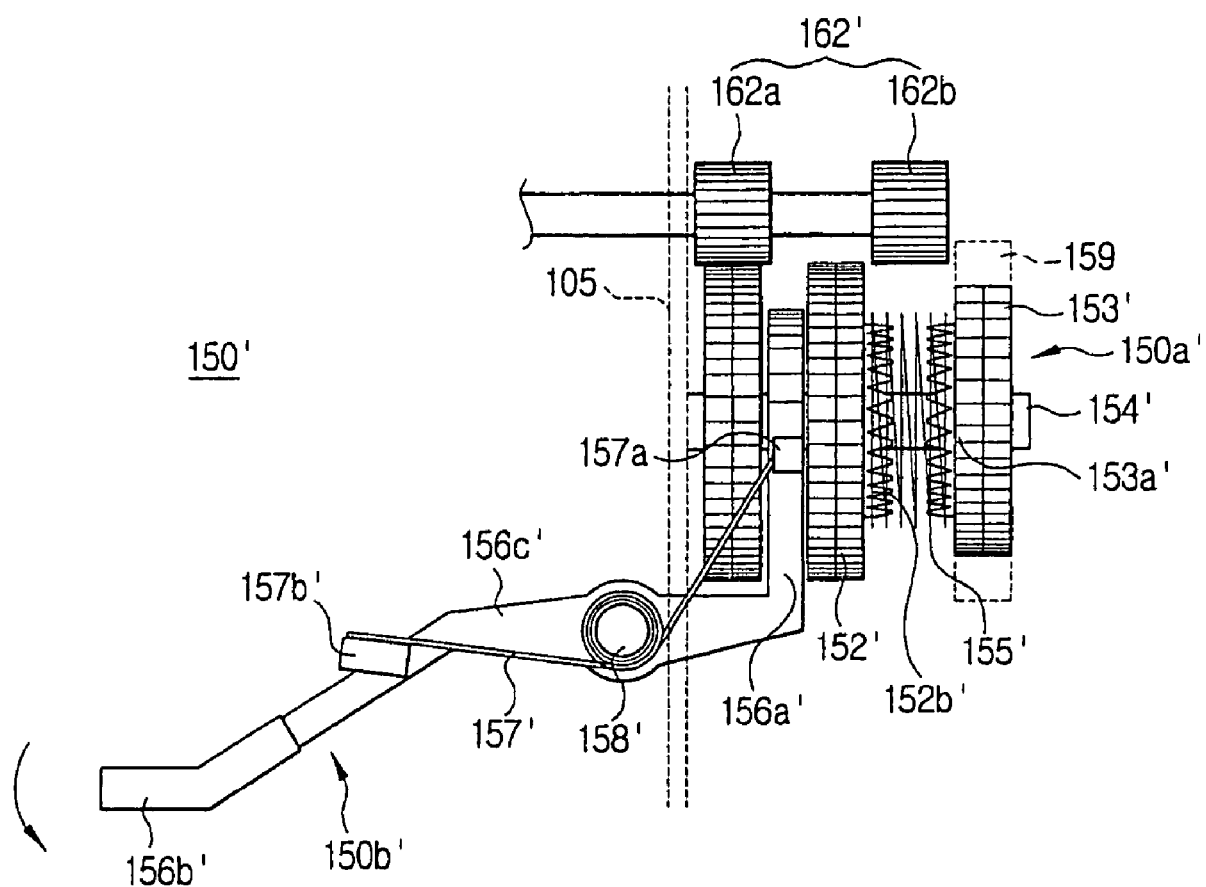
FIG. 16 is a top plan view of one modified example of the power switching part of the driving apparatus, according to an aspect of the present invention.

FIG. 16 shows another modified example of the power switching part of the driving apparatus 100, according to an aspect of the present invention.

In the second modified power switching part 150', a driving motor gear 162' of the paper-feed/scanner driving motor 161 is composed of first and second gear 162a and 162b, which are coaxially disposed in a spaced-apart relation with each other.

The second power switching part 150' is provided with a second clutch 150a' disposed among the driving motor 161, the scanner driving part 120, and the printer driving part 160 to move between a third power transmitting position (FIG. 16), which transmits the power of the driving motor 161 only to the second reduction gear 164 of the printer driving part 160, and a fourth power transmitting position (not shown), which transmits the power of the driving motor 161 to both the second reduction gear 164 of the printer driving part 160 and the first power transmitting gear 159 of the scanner driving part 120. A second actuating lever 150b' is disposed on a moving path of the carrier 141 to be actuated by the carrier 141. The second actuating lever 150b' moves the second clutch 150a' between the third power transmitting position and the fourth power transmitting position.

The second clutch 150a' includes a second rotation axis 154' disposed at the paper feed frame 105, and a second paper-feed clutch gear 151' disposed at the second rotation axis 154' to engage with the second reduction gear 164 of the printer driving part 160 and the first gear 162a of the driving motor 161. The second clutch 150a' also includes second scanner clutch gear 153' disposed at the second rotation axis 154' to engage with the first power transmitting gear 159 of the scanner driving part 120 positioned thereon. The second scanner clutch gear 153' includes second scanner clutch teeth 153a' formed on a face thereof, which is located toward the second paper-feed clutch gear 151'. The second clutch 150a' includes a second middle clutch gear 152' disposed at the second rotation axis 154' between the second paper-feed clutch gear 151' and the second scanner clutch gear 153' to engage with or disengage from the second gear 162b of the driving motor 161. The second middle clutch gear 152' includes second homologous scanner clutch teeth 152b' formed on one face thereof opposite to the second scanner clutch teeth 153a' to engage therewith, and a second clutch spring 155' disposed between the second middle clutch gear 152' and the second scanner clutch gear 153'.

Contrary to the first power transmitting part 150 explained with reference to FIGS. 11, 14 and 15, the clutch teeth to switch the power are not formed between the second paper-feed clutch gear 151' and the second middle clutch gear 152'.

The second scanner clutch teeth 153a' and the second homologous scanner clutch teeth 152b' are respectively formed of a plurality of teeth, each having a cross section such as a triangle, a rectangle, a trapezoid and the like to easily switch the power to be transmitted, which are formed at the corresponding face of the gears 153' and 152'.

The second clutch spring 155' acts to elastically urge the second middle clutch gear 152' toward the second paper-feed clutch gear 151', thereby allowing the second middle clutch gear 152' to disengage from the second gear 162b of the driving motor 161 and, at the same time, allowing the second homologous scanner clutch teeth 152b' of the second middle clutch gear 152' to disengage from the second scanner clutch teeth 153a' of the second scanner clutch gear 153'.

The second actuating lever 150b' has a second ring-shaped one end 156a' disposed between the second middle clutch gear 152' and the second paper-feed clutch gear 151' to move between a second paper-feed driving position (FIG. 16) and a first paper-feed/scanner driving position (not shown). The second actuating lever 150b' also includes second other end 156b' disposed on the moving path of the carrier 141 to be actuated by the carrier 141 when the carrier 141 is moved into the non-printing region and, thereby moving the second one end 156a' to the first paper-feed/scanner driving position. A second middle portion 156c' in the second actuating lever 150b' includes a second support axis 158' supported at the paper feed frame 105 to allow the second one end 156a' to be movable between the second paper-feed driving position and the first paper-feed/scanner driving position by the second other end 156b'.

The second paper-feed driving position is a position which the second one end 156a' allows the second middle clutch gear 152' to disengage from the second gear 162b of the driving motor 161 and, at the same time, allows the second homologous scanner clutch teeth 152b' of the second middle clutch gear 152' to disengage from the second scanner clutch teeth 153a' of the second scanner clutch gear 153'. The first paper-feed/scanner driving position is a position which the second one end 156a' moves the second middle clutch gear 152' toward the second scanner clutch gear 153' against a force of the second clutch spring 155' to allow the second middle clutch gear 152' to engage with the second gear 162b of the driving motor 161, and at the same time, to allow the second homologous scanner clutch teeth 152b' of the second middle clutch gear 152' to engage with the second scanner clutch teeth 153a' of the second scanner clutch gear 153'.

The second actuating lever 150b' is always maintained at the second paper-feed driving position by a second support spring 157' having both ends supported by third and fourth support protrusions 157a' and 157b' and a middle portion fixed on a second support axis 158'.

Accordingly, as shown in FIG. 16, when the carrier 141 is at the printing region, the second actuating lever 150b' is positioned at the second paper-feed driving position by the second support spring 157' and the second clutch spring 155'. As a result, the first middle clutch gear 152 is disengaged from the second gear 162b of the driving motor 161 and the second homologous scanner clutch teeth 152b' is disengaged from the second scanner clutch teeth 153a' of the second scanner clutch gear 153' to transmit the power of the paper-feed/scanner driving motor 161 to the second reduction gear 164 of the printer driving part 160 through the first gear 162a.

To the contrary, when the carrier 141 is moved to the non-printing region to actuate the first actuating lever 150b', the first actuating lever 150b' is rotated in the clockwise direction about the second support axis 158' by the carrier 141 to move the second middle clutch gear 152' toward the second scanner clutch gear 153' against the second support spring 157' and the second clutch spring 155'. The second middle clutch gear 152' then positioned at the first paper-feed/scanner driving position. As a result, on the condition that the first gear 162a of the driving motor 161 is engaged with the second reduction gear 164 of the printer driving part 160 through the second paper-feed clutch gear 151', the second middle clutch gear 152' is engaged with the second gear 162b of the driving motor 161 and, at the same time, the second homologous scanner clutch teeth 152b' is engaged with the second scanner clutch teeth 153a' of the second scanner clutch gear 153'. As a result, the power of the paper-feed/scanner driving motor 161 is transmitted to the first power transmitting gear 159 of the printer driving part 160 through the second gear 162b, as well as, to the second reduction gear 164 of the printer driving part 160 through the first gear 162a.

Thus, the second power transmitting part 150' has a disadvantage that the printer driving part 160 is operated during the scanning mode of driving the scanner driving part 120, but, because the scanning mode has less frequency and time of use as compared with the printing mode, there is no problem raised.

Figure 17:
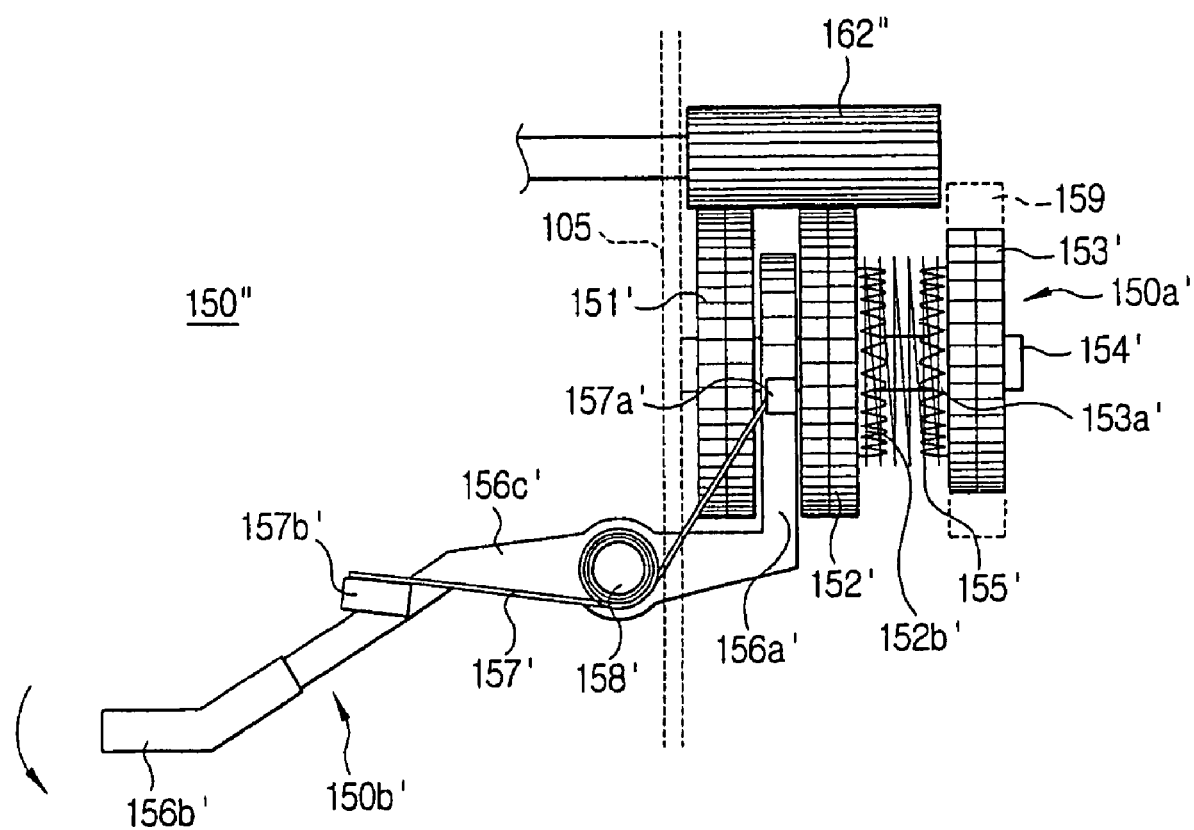
FIG. 17 is a top plan view of another modified example of the power switching part of the driving apparatus, according to an aspect of the present invention.

FIG. 17 shows still another modified example of the power switching part of the driving apparatus 100, according to an aspect of the present invention.

In a third modified power switching part 150'', a driving motor gear 162' of the paper-feed/scanner driving motor 161 includes one elongated gear 162'' which is extended in the axial direction.

A construction and an operation of the third power switching part 150'' are similar to the construction and the operation of the second power transmitting part 150' that are described above with reference to FIG. 16, except that a third middle clutch gear 152' (shown in same reference as that of FIG. 16) is always engaged with the driving motor gear 162'' even though the third middle clutch gear 152' is moved between a second paper-feed driving position (FIG. 17) and a second paper-feed/scanner driving position (not shown) by a third actuating lever 150b' (shown in same reference as that of FIG. 16). Accordingly, the description about the construction and the operation of the third power switching part 150'' will be omitted here.

Figure 18A:
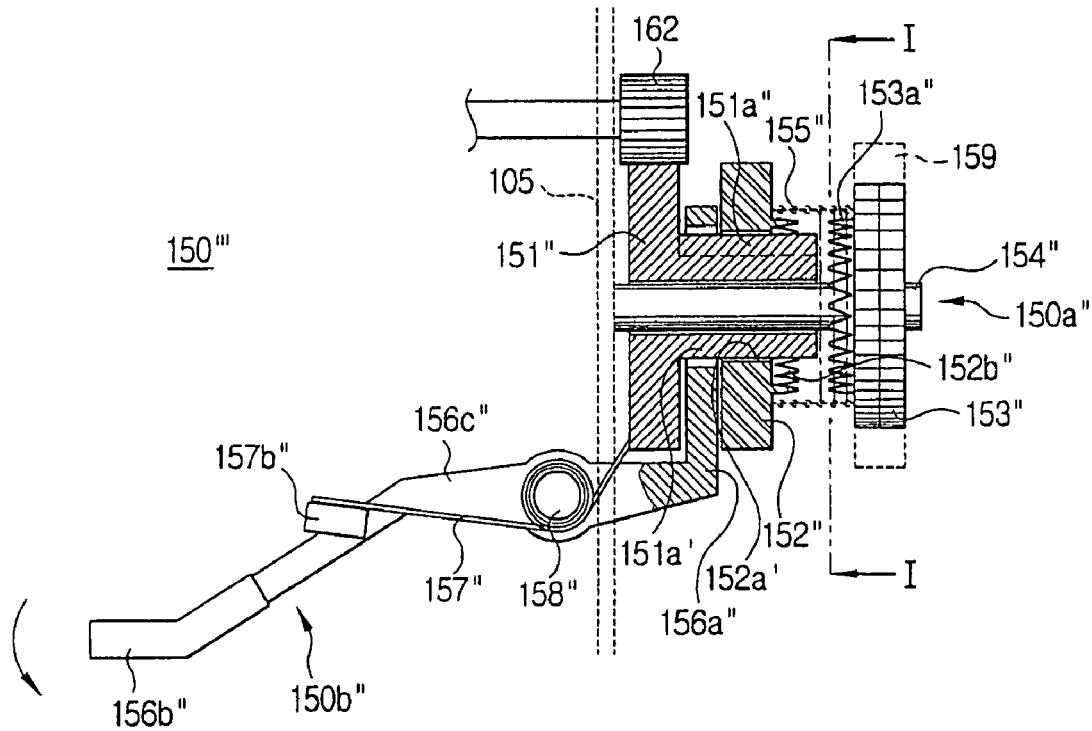
FIGS. 18A and 18B are partial cross-sectional top plan view and side elevation view of still another modified example of the power switching part of the driving apparatus, according to an aspect of the present invention.

FIG. 18A shows further another modified example of the power switching part of the driving apparatus 100 according to the present invention.

In the fourth modified power switching part 150''', a driving motor gear 162' of the paper-feed/scanner driving motor 161 is composed of one gear 162 having a normal width, like as that of the first power transmitting part 150.

The fourth power switching part 150''' includes a fourth clutch 150a'' disposed with the driving motor 161, the scanner driving part 120, and the printer driving part 160 to move between a third power transmitting position (FIG. 18A), transmitting the power of the driving motor 161 only to the second reduction gear 164 of the printer driving part 160, and a fourth power transmitting position (not shown), transmitting the power of the driving motor 161 to both the second reduction gear 164 of the printer driving part 160 and the first power transmitting gear 159 of the scanner driving part 120, and a fourth actuating lever 150b''. The fourth actuating lever 150'' is disposed on a moving path of the carrier 141 to be actuated by the carrier 141, thereby moving the fourth clutch 150a'' between the third power transmitting position and the fourth power transmitting position.

The fourth clutch 150b'' includes a fourth rotation axis 154'' disposed on the paper feed frame 105, and a fourth paper-feed clutch gear 151'' disposed on the fourth rotation axis 154'' to engage with the second reduction gear 164 of the printer driving part 160 and the driving motor gear 162' of the driving motor 161 and includes a fourth paper-feed clutch tooth 151a' formed on one face thereof. The fourth clutch 150b'' includes a fourth scanner clutch gear 153'' disposed on the fourth rotation axis 154'' to engage with the first power transmitting gear 159 of the scanner driving part 120 thereon and includes fourth scanner clutch teeth 153a'' formed on a face thereof, which is located toward the fourth paper-feed clutch tooth 151a'.

A fourth middle clutch gear 152'' in the fourth clutch 150b'', is disposed at the fourth rotation axis 154'' between the fourth paper-feed clutch gear 151'' and the fourth scanner clutch gear 153'' and includes a fourth homologous paper-feed clutch tooth 152a' formed on an inner circumference surface thereof, opposite to the fourth paper-feed clutch tooth 151a' to engage therewith and fourth homologous scanner clutch teeth 152b'', formed on a face thereof, are opposite to the fourth scanner clutch teeth 153a'' to engage therewith. A fourth clutch spring 155'' is disposed between the fourth middle clutch gear 152'' and the fourth scanner clutch gear 153'' to elastically urge the fourth middle clutch gear 152'' toward the fourth paper-feed clutch gear 151'', thereby allowing the fourth middle clutch gear 152'' to separate from the fourth scanner clutch gear 153''.

Figure 18B:
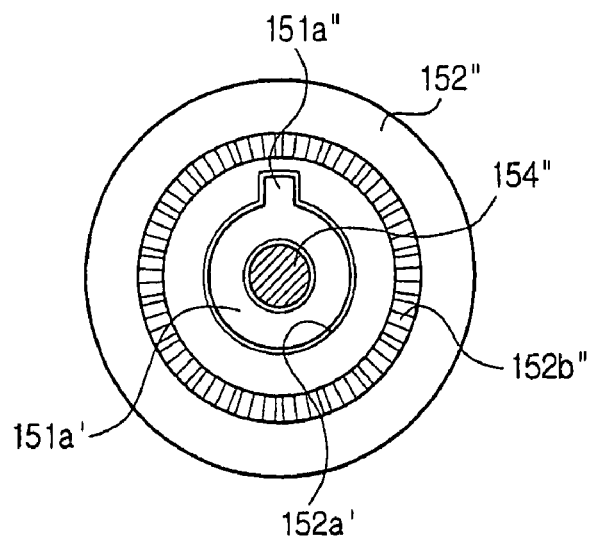

As shown in FIG. 18B taken along a line I-I of FIG. 18A, the fourth paper-feed clutch tooth 151a' and the fourth homologous paper-feed clutch tooth 152a' are respectively formed of a first sliding boss projected in the axial direction from the one face of the fourth paper-feed clutch gear 151'', and a first sliding boss-engaging portion formed in the inner circumference surface of the fourth middle clutch gear 152'' to slidably receive the first sliding boss in the axial direction. Accordingly, the fourth paper-feed clutch tooth 151a' is always engaged with the fourth homologous paper-feed clutch tooth 152a' to transmit the power of the driving motor 161. The first sliding boss has a first sliding key or tooth 151a'' formed to be extended in the axial direction on an outer circumference surface thereof, and the first sliding boss-engaging portion has a first receiving groove formed in a shape corresponding to the first sliding key 151a'' at the inner circumference surface of the fourth middle clutch gear 152''.

Also, the fourth scanner clutch teeth 153a'' and the fourth homologous scanner clutch teeth 152b'' are respectively formed of a plurality of teeth, each having a cross section such as a triangle, a rectangle, a trapezoid and the like to easily switch the power to be transmitted, which are formed at the corresponding face of the gears 153'' and 152''.

The second actuating lever 150b'' has a fourth ring-shaped one end 156a'' disposed to receive the fourth rotation axis 154'' between the fourth middle clutch gear 152'' and the fourth paper-feed clutch gear 151'' to move between a fourth paper-feed driving position (FIG. 18A) and a third paper-feed/scanner driving position (not shown). A fourth other end 156b'' is disposed on the moving path of the carrier 141 to be actuated by the carrier 141 when the fourth other end 156b'' is moved to the non-printing region and, thereby moving the fourth one end 156a'' to the third paper-feed/scanner driving position. A fourth middle portion 156c'' includes a fourth support axis 158'' supported at the paper feed frame 105 to allow the fourth one end 156a'' to be movable between the fourth paper-feed driving position and the third paper-feed/scanner driving position by the fourth other end 156b''.

The fourth paper-feed driving position is a position that the fourth one end 156a'' allows the fourth homologous scanner clutch teeth 152b'' to disengage from the fourth scanner clutch teeth 153a''. The third paper-feed/scanner driving position is a position that the fourth one end 156a'' moves the fourth middle clutch gear 152'' toward the fourth scanner clutch gear 153'' against a force of the fourth clutch spring 155'' to allow the fourth homologous scanner clutch teeth 152b'' to engage with the fourth scanner clutch teeth 152a''.

The fourth actuating lever 150b'' is always maintained at the fourth paper-feed driving position by a fourth support spring 157'' having both ends supported by seventh and eighth support protrusions 157b'' (only one shown) and a middle portion fixed on a fourth support axis 158''.

Accordingly, when the carrier 141 is at the printing region, the fourth actuating lever 150b'' is positioned at the fourth paper-feed driving position by the fourth support spring 157'' and the fourth clutch spring 155'', so that the power of the paper-feed/scanner driving motor 161 is transmitted to the second reduction gear 164 of the printer driving part 160 through the fourth paper-feed clutch gear 151''.

To the contrary, when the carrier 141 is at the non-printing region, the fourth actuating lever 150b'' is positioned at the third paper-feed/scanner driving position by the carrier 141 to move the fourth middle clutch gear 152'' toward the fourth scanner clutch gear 153'' against the fourth support spring 157'' and the fourth clutch spring 155''. Accordingly, at this time, on a condition that the first sliding key 151a'' extended in the axial direction and on an outer circumference surface of the first sliding boss 151a' is messed with the first receiving groove of the first sliding boss-engaging portion 152a', the fourth homologous scanner clutch teeth 152b'' of the fourth middle clutch gear 152'' is engaged with the fourth scanner clutch teeth 153a'' of the fourth scanner clutch gear 153''. Accordingly, the power of the paper-feed/scanner driving motor 161 is transmitted to the first power transmitting gear 159 of the printer driving part 160, as well as, to the second reduction gear 164 of the printer driving part 160.

Thus, like as the second and third power switching parts 150' and 150'' described above, the fourth power transmitting part 150''' has an disadvantage that the printer driving part 160 is operated during the scanning mode driving the scanner driving part 120, but because the scanning mode has less frequency and time of use compared to the printing mode, there is no problem raised.

Figure 19:
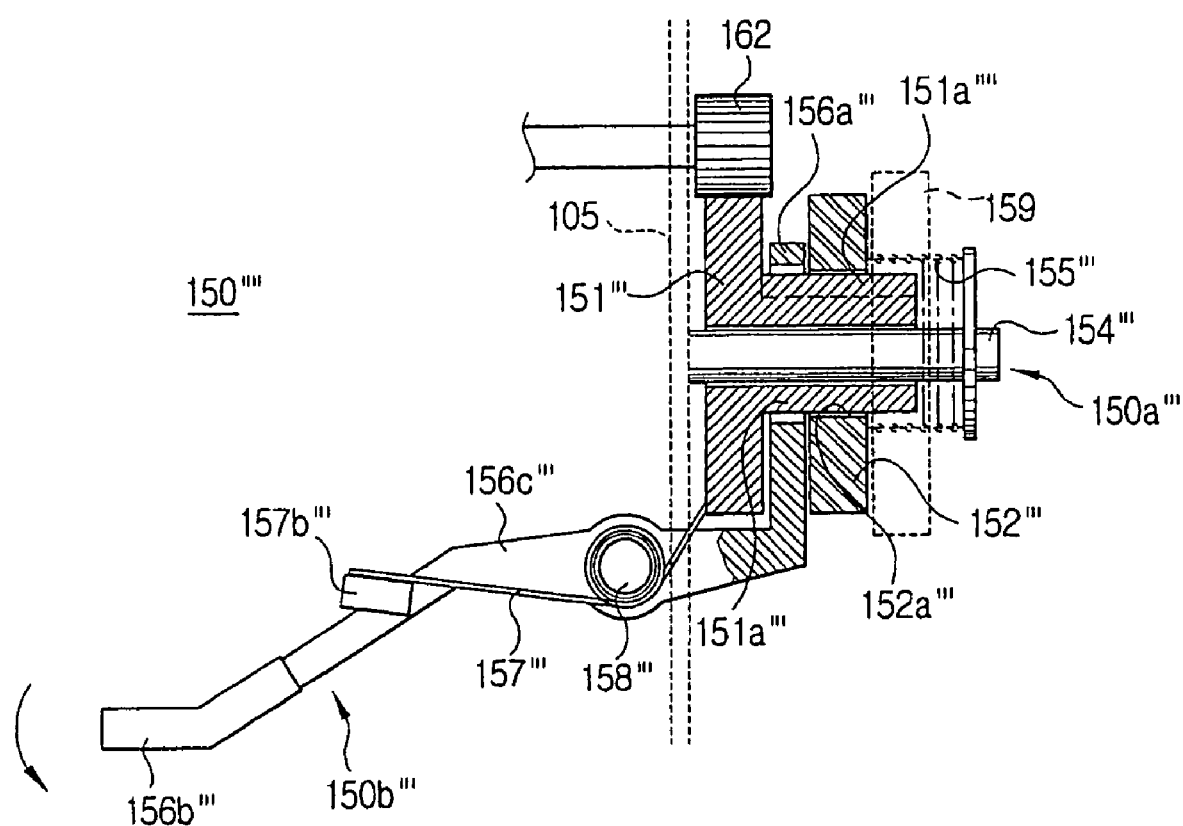
FIG. 19 is a partial cross-sectional top plan view of also another modified example of the power switching part of the driving apparatus, according to an aspect of the present invention.

FIG. 19 shows also another modified example of the power switching part of the driving apparatus 100, according to an aspect of the present invention.

In the fifth modified power switching part 150'''', a driving motor gear of the paper-feed/scanner driving motor 161 includes one gear 162 having a normal width, similar to the one associated with the first power transmitting part 150.

Similarly with the second, third, and fourth power switching parts 150', 150'', and 150''' described above, the fifth power switching part 150'''' is provided with a fifth clutch 150a'''' disposed among the driving motor 161, and the scanner driving part 120 and the printer driving part 160 to move between a third power transmitting position (FIG. 19), transmitting the power of the driving motor 161 only to the second reduction gear 164 the printer driving part 160, and a fourth power transmitting position (not shown), transmitting the power of the driving motor 161 to both the second reduction gear 164 of the printer driving part 160 and the first power transmitting gear 159 of the scanner driving part 120. Also, a fifth actuating lever 150b'''' is disposed on a moving path of the carrier 141 to be actuated by the carrier 141, thereby moving the fifth clutch 150a'''' between the third power transmitting position and the fourth power transmitting position.

The fifth clutch 150b'''' has a fifth rotation axis 154'''' disposed at the paper feed frame 105, and a fifth paper-feed clutch gear 151'''' disposed at the fifth rotation axis 154'''' to engage with the second reduction gear 164 of the printer driving part 160 and the driving motor gear 162 of the driving motor 161. The fifth clutch 150b'''' includes a fifth paper-feed clutch tooth 151a'''' formed on one face thereof, and a fifth scanner clutch gear 152'''' disposed at the fifth rotation axis 154'''' to be movable between a paper-feeding position (FIG. 19), disengaging from the first power transmitting gear 159 of the scanner driving part 120 thereon, and a paper-feeding/scanning position (not shown), engaging with the first power transmitting gear 159 of the scanner driving part 120 thereon. The fifth clutch 150b'''' also includes a fifth scanner clutch tooth 152a'''' formed at an inner circumference surface thereof to engage the fifth paper-feed clutch tooth 151a'''', and a fifth clutch spring 155'''' disposed between the fifth scanner clutch gear 152'''' and a top of the fifth rotation axis 154'''', to elastically urge the fifth scanner clutch gear 152'''' toward the fifth paper-feed clutch gear 151'''', thereby maintaining the fifth scanner clutch gear 152'''' at the paper-feeding position.

Similarly to the fourth paper-feed clutch tooth 151a' and the forth homologous scanner clutch tooth 152a' of the fourth power transmitting part 150''' shown in FIG. 18a, the fifth paper-feed clutch tooth 151a'''' and the fifth scanner clutch tooth 152a'''' are respectively formed of a second sliding boss projected in the axial direction from the one face of the fifth paper-feed clutch gear 151'''' and a second sliding boss-engaging portion formed at an inner circumference surface of the fifth scanner clutch gear 152'''' to receive the second sliding boss to be slidable in the axial direction. Accordingly, the fifth paper-feed clutch tooth 151a'''' and the fifth scanner clutch tooth 152a'''' are always engaged with each other to transmit the power of the driving motor 161. The second sliding boss has a second sliding key or tooth 151a''''' formed to be extended in the axial direction on an outer circumference surface thereof, and the second sliding boss-engaging portion has a second receiving groove formed in a shape corresponding to the second sliding key 151a''''' at the inner circumference surface of the fifth scanner clutch gear 152''''.

The fifth actuating lever 150b'''' includes with a fifth ring-shaped one end 156a'''', which is disposed to receive the fifth rotation axis 154'''' between the fifth scanner clutch gear 152'''' and the fifth paper-feed clutch gear 151'''' and to move between a fifth paper-feed driving position (FIG. 19) and a fourth paper-feed/scanner driving position (not shown). The fifth actuating lever 150b'''' also includes a fifth other end 156b'''' disposed on the moving path of the carrier 141 to be actuated by the carrier 141 when it is moved to the non-printing region and, thereby moving the fifth one end 156a'''' to the fourth paper-feed/scanner driving position. The fifth actuating lever 150b'''' also includes a fifth middle portion 156c'''' having a fifth support axis 158'''' supported at the paper feed frame 105 to allow the fifth one end 156a'''' to be movable between the fifth paper-feed driving position and the fourth paper-feed/scanner driving position by the fifth other end 156b''''.

The fifth paper-feed driving position is a position which the fifth one end 156a'''' allows the fifth scanner clutch gear 152'''' to be maintained at the paper-feeding position, and the fourth paper-feed/scanner driving position is a position which the fifth one end 156a'''' moves the fifth scanner clutch gear 152'''' toward the first power transmitting gear 159 of the scanner driving part 120 against a force of the fifth clutch spring 155'''', thereby allowing the fifth scanner clutch gear 152'''' to be maintained at the paper-feeding/scanning position The fifth actuating lever 150b'''' is always maintained at the fifth paper-feed driving position by a fifth support spring 157'''', which has both ends supported by ninth and tenth support protrusions 157b'''' (only one shown) and a middle portion fixed on a fifth support axis 158''''.

Accordingly, when the carrier 141 is at the printing region, the fifth actuating lever 150b'''' is positioned at the fifth paper-feed driving position by the fifth support spring 157'''' and the fifth clutch spring 155'''', so that the power of the paper-feed/scanner driving motor 161 is transmitted to the second reduction gear 164 of the printer driving part 160.

To the contrary, when the carrier 141 is at the non-printing region, the fifth actuating lever 150b'''' is positioned at the fourth paper-feed/scanner driving position by the carrier 141 to move the fifth scanner clutch gear 152'''' toward the first power transmitting gear 159 and against the fifth support spring 157'''' and the fifth clutch spring 155''''. Accordingly, at this time, on the condition that the second sliding key 151a''''' extended in the axial direction on the outer circumference surface of the second sliding boss 151a'''' is messed with the second receiving groove of the second sliding boss-engaging portion 152a'''', the fifth scanner clutch gear 152'''' is engaged with the first power transmitting gear 159 of the printer driving part 160. Accordingly, the power of the paper-feed/scanner driving motor 161 is transmitted to the first power transmitting gear 159, as well as, to the second reduction gear 164 of the printer driving part 160.

Similarly to the second, third and fourth power switching parts 150', 150'' and 150''' described above, the fifth power transmitting part 150'''' also has an disadvantage that the printer driving part 160 is operated during the scanning mode when driving the scanner driving part 120, but because the scanning mode has less frequency and time of use as compared with the printing mode, there is no problem raised.

As apparent from the foregoing description, it can be appreciated that the driving apparatus of the multi-function machine, according to an aspect of the present invention, provides an effect which can drive the scanner driving part and the printer driving part by one driving motor, thereby reducing a fabrication cost.

Also, the swing gear train forming the power transmitting apparatus of the present invention provides an effect which can prevent the first and second power transmitting gears on the paper feed frame and the scanner frame, respectively, from being disengaged from or worn away by each other, even though the paper feed frame and the scanner frame are wrongly assembled due to a fabrication tolerance.

Also, the power switching part of the present invention provides an effect that can drive the printer driving part and the scanner driving part by one driving motor by using the actuating lever, which is operated by a compulsory pressing member, such as the carrier.

Although an aspect of the present invention has been described, it will be understood by those skilled in the art that the present invention should not be limited to the described aspect, but various exchanges and modifications can be made within the spirit and the scope of the present invention. Accordingly, the scope of the present invention is not limited within the described range but the following claims.

What is claimed is:

1. A multifunction machine comprising:
   an image reading unit which reads out an original image and forms image data;
   an image forming unit which forms the image data onto a recording medium as an image; and
   a power transmitting unit which switches a power between the image forming unit and the image reading unit,
   wherein the power transmitting unit comprises
   a first gear train which receives the power from a motor;
   a second gear train which receives the power from the first gear train;
   a swing gear train which is disposed between the first gear train and the second gear train so as to shift a direction in which the second gear train rotates,
   wherein the swing gear train comprises
   a swing gear;
   a swing lever; and
   idle gears which are respectively disposed at ends of the swing lever, and
   wherein an elastic member is disposed between the swing lever and the idle gears.

2. The multifunction machine as claimed in claim 1, wherein the swing lever comprises:
   a body comprising a V-shaped form and comprising an axis hole formed at a center thereof to receive a support axis of the swing gear; and
   engaging projections formed at both ends of the body to rotatably support the idle gears.

3. The multifunction machine as claimed in claim 2, wherein each of the engaging projections comprises:
   a cutting portion formed to be cut in a given width at a center of the engaging projection; and
   an anti-escaping jaw disposed at an upper portion of the engaging projection.

4. The multifunction machine as claimed in claim 3, wherein the anti-escaping jaw has an angled bottom end and a top end rounded off in a direction that a corresponding one of the idle gears is inserted.

5. The multifunction machine as claimed in claim 1, wherein the elastic member is coaxially disposed with one of the corresponding idle gears.

6. The multifunction machine as claimed in claim 5, wherein the elastic member has contact with one of the corresponding idle gears.

7. The multifunction machine as claimed in claim 6, wherein the elastic member is formed in a donut shape.

8. The multifunction machine as claimed in claim 7, wherein the elastic member comprises a leaf spring.

9. The multifunction machine as claimed in claim 1, wherein the swing lever comprises a pair of engaging projections in which the idle gears are rotatably disposed respectively, and
   the elastic member is disposed at each of the engaging projections.

10. The multifunction machine as claimed in claim 9, wherein the elastic member has contact with one of the corresponding idle gears.

11. The multifunction machine as claimed in claim 10, wherein the elastic member is formed in a donut shape.

12. The multifunction machine as claimed in claim 11, wherein the elastic member comprises a leaf spring.

13. The multifunction machine of claim 1, wherein the pair of idle gears are engaged with the same gear of the second gear train.

14. The multifunction machine of claim 13, wherein the first gear train is disposed at a first frame, and the second gear train is disposed at a second frame which is detachable from the first frame.

15. The multifunction machine as claimed in claim 1, wherein one of the idle gears is selectively connected to the second gear train so as to shift the direction in which the second gear train rotates.

16. The multifunction machine as claimed in claim 1, wherein the numbers of the idle gears disposed at the respective ends of the swing lever are different.

* * * * *